United States Patent
Benson

(10) Patent No.: US 7,636,720 B2
(45) Date of Patent: Dec. 22, 2009

(54) ASSOCIATING AND USING INFORMATION IN A METADIRECTORY

(75) Inventor: Max L. Benson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 10/435,720

(22) Filed: May 8, 2003

(65) Prior Publication Data

US 2004/0225675 A1 Nov. 11, 2004

(51) Int. Cl.
*G06F 17/00* (2006.01)
(52) U.S. Cl. ........................ 707/100; 707/201
(58) Field of Classification Search ............. 707/1–200; 709/209, 224
See application file for complete search history.

(56) References Cited

U.S. PATENT DOCUMENTS

| | | | |
|---|---|---|---|
| 4,648,036 A * | 3/1987 | Gallant ....................... 707/203 |
| 4,999,766 A | 3/1991 | Peters et al. |
| 5,838,923 A | 11/1998 | Lee et al. |
| 5,862,323 A | 1/1999 | Blakley, III et al. |
| 5,884,328 A * | 3/1999 | Mosher, Jr. ................. 707/202 |
| 5,893,116 A | 4/1999 | Simmonds et al. |
| 6,067,551 A | 5/2000 | Brown et al. |
| 6,105,062 A | 8/2000 | Andrews et al. |
| 6,185,574 B1 | 2/2001 | Howard et al. |
| 6,202,085 B1 | 3/2001 | Benson et al. |
| 6,269,406 B1 | 7/2001 | Dutcher et al. .............. 709/248 |
| 6,343,287 B1 | 1/2002 | Kumar et al. |
| 6,370,541 B1 | 4/2002 | Chou et al. |
| 6,381,734 B1 | 4/2002 | Golde et al. |
| 6,487,558 B1 | 11/2002 | Hitchcock |
| 6,496,837 B1 | 12/2002 | Howard et al. .............. 707/200 |
| 6,523,042 B2 | 2/2003 | Milleker et al. |
| 6,523,046 B2 | 2/2003 | Liu et al. |
| 6,542,515 B1 | 4/2003 | Kumar et al. |
| 6,581,074 B1 | 6/2003 | Wong et al. |
| 6,618,732 B1 | 9/2003 | White et al. |
| 6,651,047 B1 | 11/2003 | Weschler, Jr. |
| 6,757,720 B1 | 6/2004 | Weschler, Jr. |
| 6,823,336 B1 * | 11/2004 | Srinivasan et al. ............. 707/8 |
| 6,834,286 B2 | 12/2004 | Srinivasan et al. |
| 6,859,217 B2 | 2/2005 | Robertson et al. |
| 6,912,520 B2 | 6/2005 | Hankin et al. |
| 6,961,734 B2 | 11/2005 | Kauffman |
| 6,973,466 B2 | 12/2005 | Kaler et al. |

(Continued)

OTHER PUBLICATIONS

"Net users Guide" by McCauley et al., Rev. 2.2. Feb. 24, 2002. http://web.archive.org/web/20020224144453/http://www.open.com.au/nets/user.html.*

(Continued)

*Primary Examiner*—John R. Cottingham
*Assistant Examiner*—Robert Timblin
(74) *Attorney, Agent, or Firm*—Lee & Hayes, PLLC

(57) ABSTRACT

Various exemplary metadirectories, systems and/or methods include delta information, error information and/or state information to facilitate metadirectory administration and/or operation. An exemplary metadirectory relies on a hologram and a plurality of deltas to represent information related to an object of a directory. Such an exemplary metadirectory may represent the object in association with one or more processing states based on the hologram and one or more of the plurality of deltas. Various other exemplary metadirectories, systems and/or methods are also disclosed.

16 Claims, 15 Drawing Sheets

U.S. PATENT DOCUMENTS

| | | | |
|---|---|---|---|
| 6,983,227 | B1 | 1/2006 | Thalhammer-Reyero |
| 6,990,513 | B2 | 1/2006 | Belfiore et al. |
| 7,310,650 | B1 | 12/2007 | Felsted et al. |
| 7,315,826 | B1 | 1/2008 | Guheen et al. |
| 2001/0034733 | A1 | 10/2001 | Prompt et al. |
| 2001/0044805 | A1* | 11/2001 | Multer et al. ............... 707/201 |
| 2001/0051948 | A1 | 12/2001 | Srinivasan et al. |
| 2002/0030703 | A1 | 3/2002 | Robertson et al. |
| 2002/0059425 | A1 | 5/2002 | Belfiore et al. .............. 709/226 |
| 2002/0156792 | A1* | 10/2002 | Gombocz et al. ........... 707/100 |
| 2003/0101194 | A1 | 5/2003 | Rys et al. |
| 2003/0105654 | A1 | 6/2003 | MacLeod et al. |
| 2003/0131025 | A1 | 7/2003 | Zondervan et al. |
| 2003/0135517 | A1 | 7/2003 | Kauffman |
| 2003/0140210 | A1* | 7/2003 | Testardi ...................... 711/203 |
| 2003/0145003 | A1* | 7/2003 | Yellepeddy et al. ............ 707/6 |
| 2003/0163438 | A1 | 8/2003 | Barnett et al. |
| 2003/0208490 | A1* | 11/2003 | Larrea et al. ................... 707/9 |
| 2003/0236865 | A1 | 12/2003 | Anthe et al. |
| 2004/0064502 | A1* | 4/2004 | Yellepeddy et al. ......... 709/203 |
| 2004/0122844 | A1 | 6/2004 | Malloy et al. |
| 2004/0230559 | A1* | 11/2004 | Newman et al. ................ 707/1 |
| 2004/0249828 | A1 | 12/2004 | Childress et al. |
| 2005/0188367 | A1 | 8/2005 | Oberholtzer |

OTHER PUBLICATIONS

MetaConnect Technical Overview. Nov. 1999, p. 1-12.*
Sheresh, Doug. "Understanding Directory Services". Systems Research Corporation, 2nd edition. 2001, 621 pages.*
Meta-Directory: Architecture Module. http://www.ite.edu.sg/~itewebms/MetaDir_WBT/management/logs.html. 2000.*
Zhou, "Directory Integration and the Metadirectory", 1999, pp. 1-12.
Steen et al., Master Thesis in Computer Engineering; Integrating ABB Aspect Directory with Microsoft Active Directory; 76 pages.
Steen et al. "Integrating ABB Aspect Directory with Microsoft Active Directory", Thesis Paper, The Department of Computer Science and Electronics, Malardalens Hogeskola University, 2001, pp. 44-58.
Zhou, "Directory Integration and the Metadirectory", Jul. 1999, pp. 111.
Robertson, et al., "Polyarchy Visualization: Visualizing Multiple Intersecting Hierarchies", CHI 2002, Minneapolis, MN, USA, Apr. 20-25, 2002, 8 pages.

* cited by examiner

Exemplary Screen Shot 1000

Exemplary Screen Shot

Exemplary Screen Shot 1200

Exemplary Screen Shot 1300

Exemplary Screen Shot 1400

Exemplary Screen Shot 1500

ASSOCIATING AND USING INFORMATION IN A METADIRECTORY

CROSS-REFERENCE TO RELATED APPLICATIONS

The instant application is related to co-pending U.S. patent application Ser. No. 10/434,725, entitled "Attribute Value Selection for Entity Objects," by Kim Cameron, Max L. Benson, Matthias Leibmann, Edward H. Wayt, Kevin Miller and James Booth; U.S. patent application Ser. No. 10/435,113, entitled "Declarative Rules for Metadirectory," by Kim Cameron, Max L. Benson, and James Booth; U.S. patent application Ser. No. 10/434,726, entitled "Relational Directory," by Kim Cameron, James Booth, Matthias Leibmann, Max L. Benson and Mark Brown; U.S. patent application Ser. No. 10/434,411, entitled "Automated Information Management and Related Methods," by Max L. Benson, Stephen Siu, and James Booth; U.S. patent application Ser. No. 10/435,712, entitled "Preview Mode," by Kim Cameron, Max L. Benson, Derek Murman, Edward H. Wayt, Jeffrey Bisset, Jie Liu, and Jing Wu; U.S. patent application Ser. No. 10/435,708, entitled "Rules Customization and Related Methods," by Max L. Benson, Michael Jerger, Edward H. Wayt, Kenneth Mark, Kim Cameron, Matthias Leibmann, and Jing Wu; all of which are filed concurrently herewith, assigned to the assignee of the present invention, and incorporated herein by reference for all that they teach and disclose.

TECHNICAL FIELD

The subject matter relates generally to synchronization of information and more specifically to synchronization of information in a plurality of information structures or hierarchies.

BACKGROUND

Often a company stores important information in various data sources. For example, a human resources department may store information about employees in a human resources data source wherein the information is arranged or organized according to a human resources specific information structure or hierarchy and a finance department may store information about employees, clients, suppliers, etc., in a finance department data source wherein the information is arranged or organized according to a finance department information structure or hierarchy. In this example, some common information may exist in both data sources. Thus, a need for synchronizing the information arises.

A synchronizing process typically implements rules and/or specifications to adequately harmonize information in various data sources. Further, such a process may rely on an engine capable of executing software and a storage capable of storing the information, as appropriate. In general, a synchronizing process replicates information from various data sources in a central storage, wherein the replicated information has some degree of integrity. To achieve this task, information from the various data sources are either pushed or pulled into the synchronizing process. In addition, information may be pulled or pushed out of such a central storage to various data sources. Maintaining efficiency and information integrity in such an environment can become a daunting task.

Various exemplary methods, devices and/or systems described below are directed to meeting this task.

SUMMARY

Various exemplary metadirectories, systems and/or methods include delta information, error information and/or state information to facilitate metadirectory administration and/or operation. An exemplary metadirectory relies on a hologram and a plurality of deltas to represent information related to an object of a directory. Such an exemplary metadirectory may represent the object in association with one or more processing states based on the hologram and one or more of the plurality of deltas. Various other exemplary metadirectories, systems and/or methods are also disclosed.

DETAILED DESCRIPTION

Overview

Various exemplary devices, systems and/or methods described herein reference an information environment that includes a metadirectory. While a metadirectory may be used to explain, various exemplary devices, systems and/or methods may be applied generally to information environments wherein synchronization of information is desired or required. In general, information should be identifiable in an information environment, for example, through use of an identifier, and preferably an immutable or trackable identifier. In some instances, information is structured or organized in a hierarchy. For example, a directory may organize entities (e.g., and attributes, etc.) in a hierarchy.

Exemplary Metadirectory System

Figure 1:
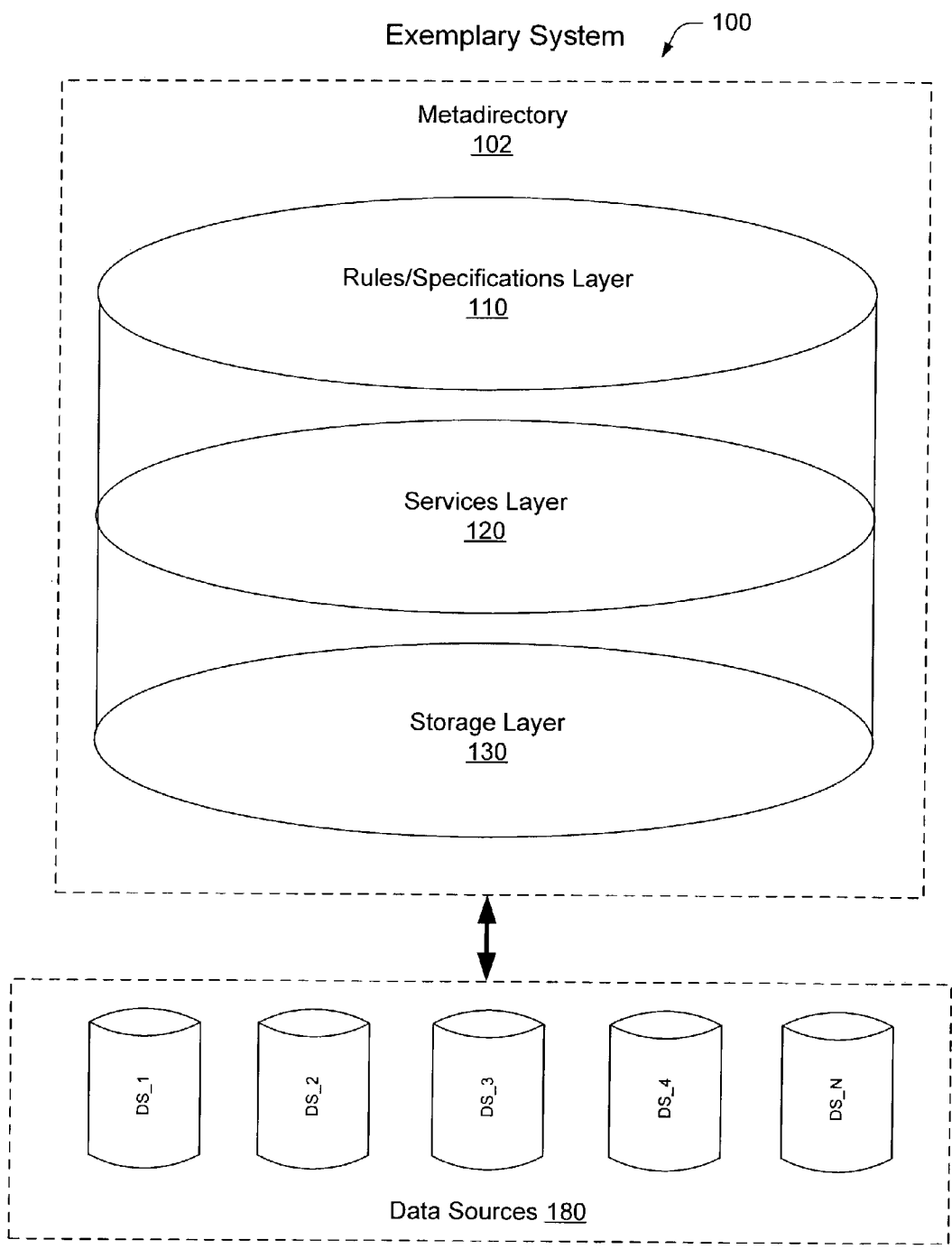
FIG. 1 is a diagram of an exemplary system that includes metadirectory and a plurality of data sources.

FIG. 1 shows an exemplary system 100 that includes an exemplary metadirectory 102 capable of communicating information to and/or from a plurality of data sources 180 (e.g., DS_1, DS_2, DS_3, DS_4 ... DS_N). The data sources 180 may be disparate or associated. For example, the data source DS_1 may have a directory that includes one or more entries associated with a directory of the data source DS_3. A disparate data source does not have directory entries associated with a directory of another data source; however, a disparate data source may still be served by the exemplary metadirectory 102.

The exemplary metadirectory 102 includes a rules and/or specifications layer 110, a services layer 120 and a storage layer 130. The rules and/or specifications layer 110 may include rules and/or specifications that form or define one or more protocols, APIs, schemata, services, hierarchies, etc. The services layer 120 typically includes service modules capable of execution on an execution engine. An execution engine may rely on an operating system, a virtual machine, a compiler, a runtime engine, etc. For example, service modules may include code and/or script suitable for execution on a virtual machine, a computer, etc. Typically, such code and/or script apply or follow rules and/or specifications set forth in a rules and/or specifications layer. Further, an exemplary metadirectory may allow for distribution of service modules to data sources wherein the service modules may execute on an engine of such data sources. The storage layer 130 allows for storage of information such as information having a high level of integrity. However, a storage layer may also allow for storage of information having a lesser level of integrity. For example, a storage layer may allow for scratch or buffer area that, in turn, may aid in processing information to achieve a certain level of information integrity.

Overall, the exemplary metadirectory 102 can provide an overarching view of one or more directories as used in one or more data sources 180. Such an exemplary metadirectory may consolidate information as contained in multiple directories in a centralized manner, manage relationships between directories and allow for information to flow between directories, as appropriate.

Figure 2:
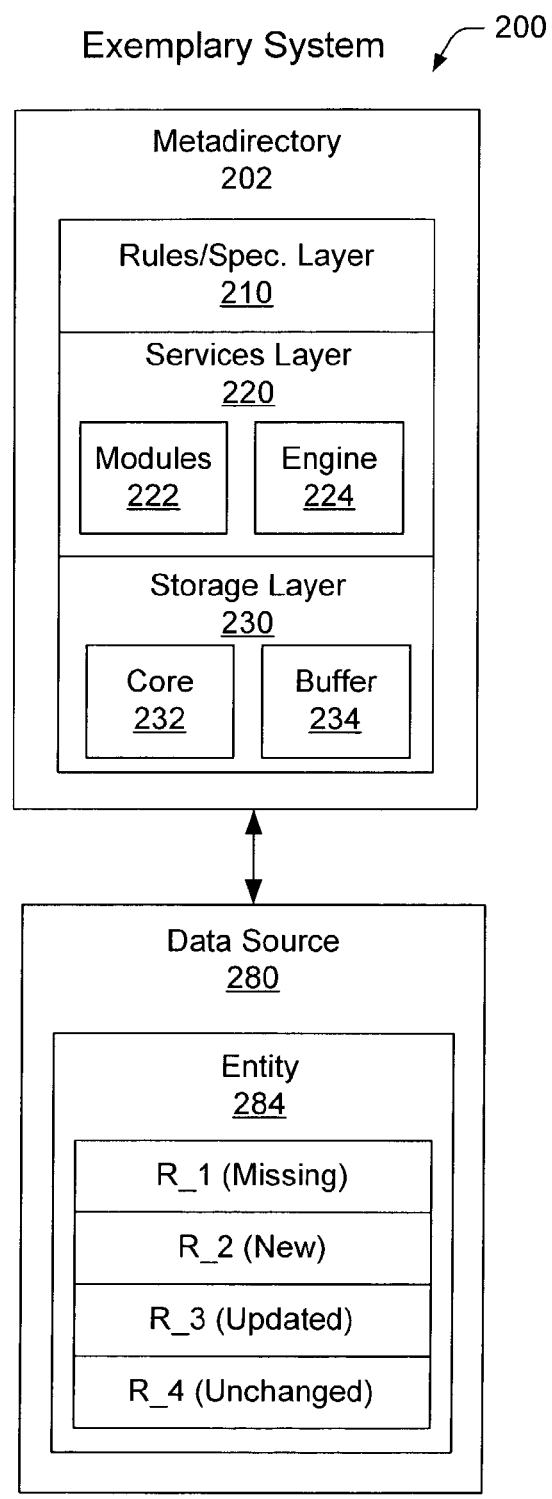
FIG. 2 is a block diagram of an exemplary system that includes a metadirectory and a data source.

FIG. 2 shows an exemplary system 200 that includes an exemplary metadirectory 202 and a data source 280. The metadirectory 202 includes a rules and/or specification layer 210, a services layer 220 and a storage layer 230. The services layer 220 includes service modules 222 and an engine 224. The storage layer 230 includes core area 232 and buffer area 234, which optionally serves as a scratch pad. The data source 280 includes an information entity 284 having one or more informational records and in this instance four records R_1, R_2, R_3 and R_4. The records have associated operations, operation commands or operation indicators. For example, the record R_1 is labeled as "missing", which may indicate that the record R_1 was deleted and hence, the associated operation for record R_1 may be "delete". The record R_2 is labeled as "new", which may indicate that the record R_1 was added and hence, the associated operation for record R_2 may be "add". The record R_3 is labeled as "update", which may indicate that a change has occurred to the record R_3 and hence, the associated operation for record R_3 may be "update" or "modify". The record R_4 is labeled as "unchanged", which may indicate that no changes have occurred to the record R_4 and hence, the associate operation for record R_4 may be "unchanged". Again, as described in the Background section, a directory typically allows for basic operations such as add, delete and modify.

Figure 3:
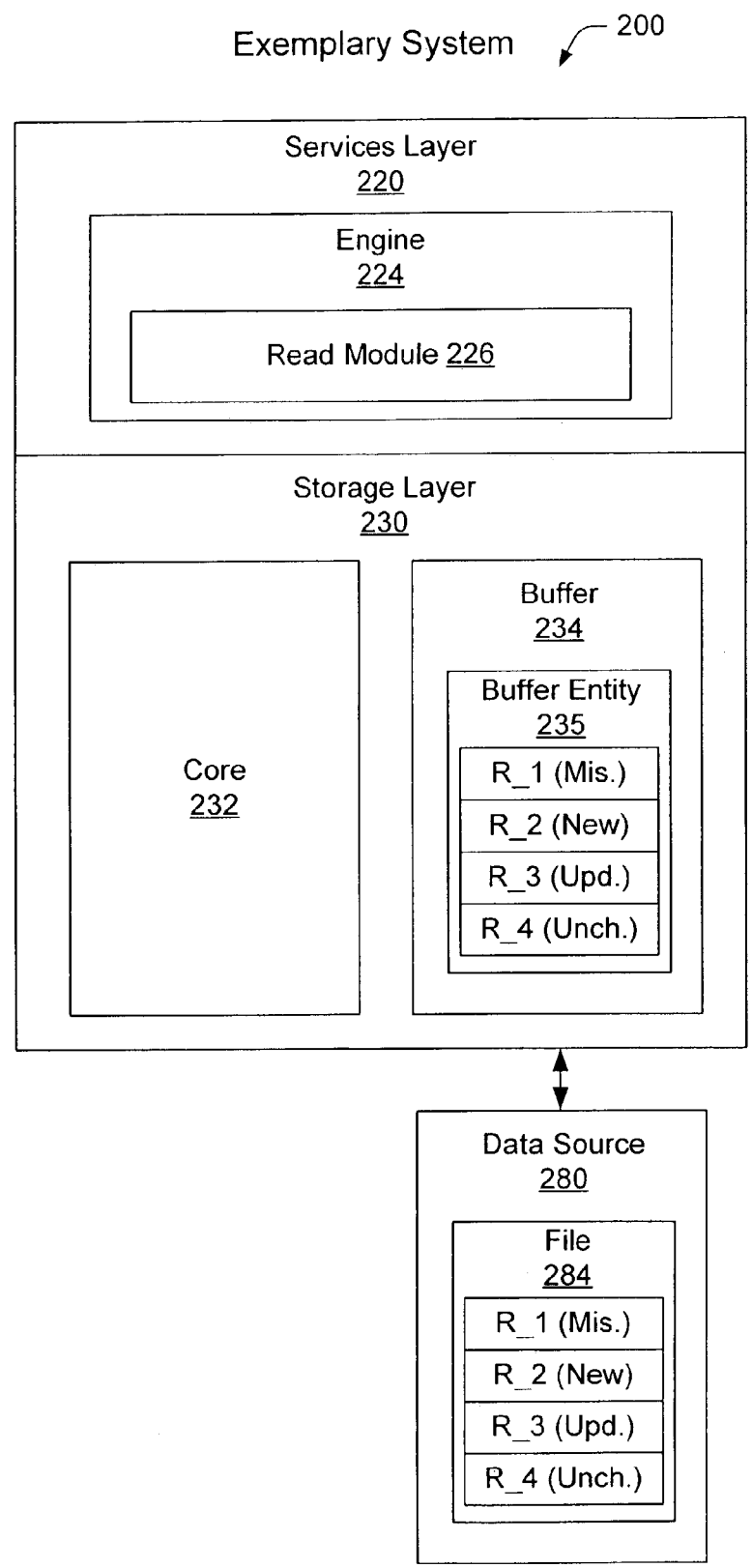
FIG. 3 is a block diagram of an exemplary system that includes a services module for communicating information from a data source to a storage layer of an exemplary metadirectory.

FIG. 3 aims to show the exemplary system 200 of FIG. 2 in operation. According to this mode of operation, a read module 226 executes on the service engine 224 to thereby cause information of the data source 280 to be written to the buffer area 234 of the storage layer 230. In this instance, the exemplary system 200 operates in a pull mode, whereby the metadirectory pulls information from a data source. Of course, a push mode is also possible, for example, where a data source initiates communication of information from the data source to a storage layer of a metadirectory.

In this example, the buffer area 234 now contains a buffered informational entity 235 that includes the records R_1, R_2, R_3 and R_4 and associated operations, operation commands and/or other operation indicators. As described herein, various exemplary metadirectories, systems and/or methods can offer services not found in traditional metadirectories by associating operations with directory information in a metadirectory storage layer. Further, where required or desired, one or more record values are also associated with records and operations.

In this and/or other examples, an informational entity, whether in a data source or in a metadirectory, may exist as an object associated with a hierarchical level of a directory and/or a metadirectory. Such an entity typically has naming information such as a distinguished name (DN), a globally unique identifier (GUID), an entity type (e.g., an object type), which may all be single valued. Further, an entity may have an entity class (e.g., an object class as an ordered list of string values) which may be considered distinct from attributes. At a lower level, an entity may include one or more attributes wherein each attribute may have one or more values.

In the exemplary system 200, the records (R_1, R_2, R_3 and R_4) in the entity 284 were associated with change information. In this instance, the records may correspond to attributes. However, change information may exist at more than one level. For example, at an attribute level change information may include add, update, delete, unchanged, etc., whereas, at an entity level (e.g., an object level), change information may include change types: add, update, delete (e.g., deleted by a data source), delete-add (e.g., old entity deleted, new entity with same name created), obsolete (e.g., entity no longer is reported by a data source), no-change, old DN, new DN, etc. In this example of entity level change types, all of the change types except no-change can include an entity rename.

Change information may also exist at other levels, for example, at an entity class level wherein an update can optionally include an entity class change. At the attribute level, already mentioned, a change may occur as well as a change in value. For example a change at the attribute level may include an operation command to add, update, delete, no-change, etc., whereas, at the value level, a change may include an operation command to add, delete, etc.

An entity, as shown below, may exist as an object that includes one or more attributes wherein the attributes have one or more values. Of course, attributes may also have a type indicator (e.g., string, integer, etc.). For example, an object for an employee "JohnS" may include the following attribute names and values:

| Attr Name: | Manager "MaryJ" |
|---|---|
| Attr Name: | Office "40/6062" |
| Attr Name: | Telephone "(425)-882-8080, (425)-706-7789" |
| Attr Name: | Email "bigjohn" |

Such an object may be part of a tree hierarchy, for example, a branch of a company, state, organization, etc., information hierarchy or structure.

Rules and/or specifications may define a schema or schemata that govern organization or structure for data storage, whether relational, object-oriented, etc. A schema may refer to a visualization of a data storage structure and/or to a formal text-oriented description of data storage. As described herein, an exemplary metadirectory includes a schema for defining entities (e.g., objects) that include additional information. Additional information may be delta information, error information, state information, etc. In particular, various exemplary metadirectories, systems and/or methods include objects defined to include delta information, error information and/or state information. Again, delta information may include one or more attribute names, one or more attribute values and/or one or more operation commands (e.g., add, delete, modify, etc.). Of course, where appropriate other information such as but not limited to attribute type may be included in a metadirectory object definition. Such metadirectory object definitions typically apply to objects stored in a buffer of a metadirectory storage layer (e.g., buffer entities) and may apply to objects stored in a core of a metadirectory storage layer (e.g., core entities).

Various exemplary metadirectories, systems and/or methods refer to a staged object, which may be a type of buffer entity. A staged object is generally an object defined by a metadirectory wherein information pertaining to the object is stored in a storage of the metadirectory, typically a buffer area. Sometimes, the buffer area is referred to as a connector space or a connector namespace. Information pertaining to objects defined by a metadirectory and stored in a buffer (e.g., a connector space) may be representations of objects in a data source. Each object represented in a buffer (e.g., a connector space) typically has an anchor. All objects represented in a buffer (e.g., a connector space) typically have the two distinguishing attributes: (i) a Globally Unique Identifier (GUID) and (ii) a distinguished name (DN).

Objects represented in a buffer (e.g., a connector space) may also have an anchor attribute. An anchor attribute uniquely identifies an object in a data source. The anchor may represent a link between a staged object and its representation in a data source. Various exemplary metadirectories assume that the anchor of an object never changes over the lifetime of an object and thus such exemplary metadirectories may use an anchor to locate a corresponding representation of an object in a buffer (e.g., a connector space).

For the example shown in FIG. 3, the buffered entity 235 may exist as an object in an object class "oc: users" with a distinguished name "dn: JohnS, XYX Corp" wherein the records R_1, R_2, R_3 and R_4 correspond to attributes Manager, Office, Telephone and Email, respectively and their values. Of course, associated operations and values where appropriate also exist in the storage layer 230. Such additional information (e.g., operation information, values, etc.) may exist on an object or in association with an object; in either instance, an object definition may include additional information. Various exemplary metadirectories store information pertaining to an object in a database. As such, additional information associated with the object is typically stored in the same database and optionally in a related database. As described herein, various exemplary metadirectories store at least some additional information in a column of a database according to a binary data type. Of course, some additional information may be more appropriately stored as XML text, etc. (see, e.g., error information described below).

Various exemplary metadirectories, systems and/or methods that include associating additional information via storing such information directly on an object can avoid a need for cross-referencing such information. In a traditional metadirectory changes and error information are stored separately from objects, for example in an event viewer or a log file, thereby necessitating a cross-referencing of information when troubleshooting. Again, "storing on an object" refers to defining the object to include the additional information and/or associating the additional information with information (e.g., names, values, etc.) pertaining to the object.

Referring to the operations associated with records R_1, R_2, R_3 and R_4, R_1 is associated with a delete operation, R_2 is associated with an add operation, R_3 is associated with an update operation and R_4 is associated with an unchanged indicator. Individual record deltas may be defined for each of these records or an entity (or object) delta may be defined for the entity (or object). For example, individual record deltas may be defined as below:

R_1_Δ: delete, attr name "Manager"
R_2_Δ: add, attr name "Office", attr value "40/6062"
R_3_Δ: update, attr name "Telephone", attr value 1 "(425)-882-8081"
R_4_Δ: unchanged, attr name "Email"

In this example, the record deltas contain all of the operational and value information typically required to manage an entity or object of a disparate directory. Where associated directories exist in a plurality of data sources, information may change in an asynchronous manner or in a synchronous manner wherein rules are required to adequately manage the information from the various data sources. In either case, record deltas can allow for services and benefits not found in traditional metadirectories. Various exemplary metadirectories, systems and/or methods described herein include record deltas stored in a storage layer of an exemplary metadirectory. Such record deltas include operation and value information as appropriate associated with records of one or more directories.

While various examples include data sources having entities wherein operation history is known, other examples exist wherein operation history is discovered. For example, a data source may communicate directory information to an exemplary metadirectory wherein the information does not indicate whether a particular entity or record has been added, deleted, modified, etc. If the exemplary metadirectory includes historical directory information for the particular directory, then the exemplary metadirectory may discover operation information, for example, based on a comparison between the communicated information and the stored historical information for the directory.

In instances where only changed information about a directory is communicated to a metadirectory, such a communication may be referred to as a delta import. Given a particular scope, a communication that communicates all directory information within that scope to a metadirectory is generally referred to as a full import. For example, information may exist in a partition in a data source. A partition is typically a logical volume of data in a buffer area or in a data source. The type of communication between a data source and a metadirectory may depend on data source capabilities. For example, some data sources may not be able to track changes and hence must rely on full import communications with a metadirectory, noting that full import communications may in some instances include change information.

Figure 4:
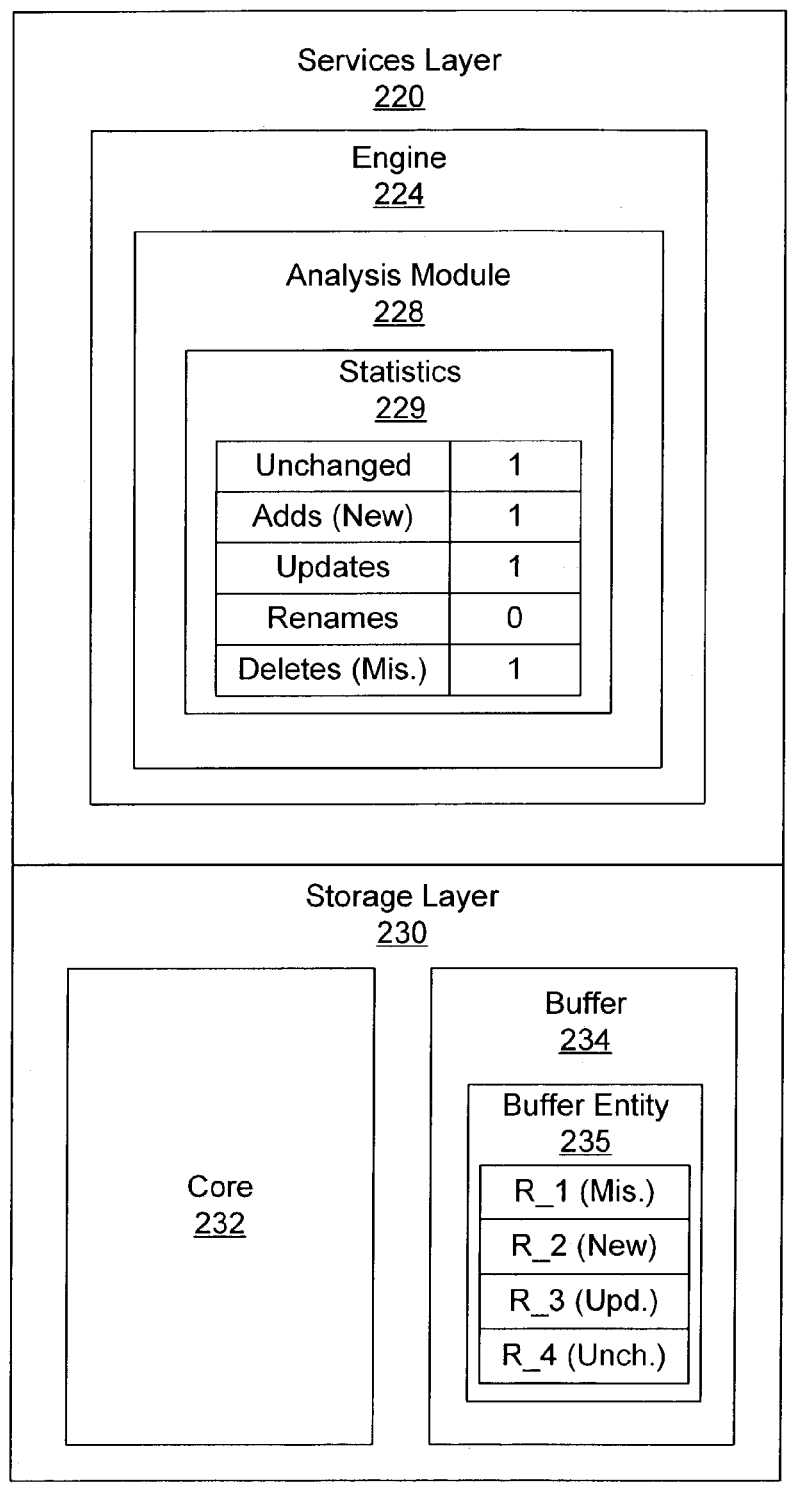
FIG. 4 is a block diagram of an exemplary services layer and an exemplary storage layer wherein an analysis service module executes on a service engine to analyze information in the storage layer.

FIG. 4 shows a service layer 220 and a storage layer 230 of an exemplary metadirectory (e.g., the exemplary metadirectory 202). In this example, the services layer 220 includes an exemplary analysis module 228 suitable for execution on the service engine 224. Various types of exemplary analyses may be performed. For example, an exemplary analysis can allow for searching a buffer area for entities (or sublevels thereof) based on operation command, error, export, etc. Such an analysis may list records that match the search criterion or criteria. As explained herein, operation commands, errors, state-information, etc., may be "staged" on objects in a buffer area. In other words, such additional information may be associated with or stored with an informational entity in a buffer area. Another exemplary analysis can allow for calculation of a "census" of the types of objects (e.g., number of adds, etc.), for example, by counting records that match selected criterion or criteria. Analysis results may be displayed by a user interface (UI) and/or be used programmatically to make decisions (e.g., in operational scripts, etc.). Yet another exemplary analysis can allow for statistics. For example, a service module may include software that allows for tabulating statistics on what information has been processed.

In the example shown in FIG. 4, the exemplary analysis module 228 allows for analyzing change events or operations that pertain to one or more directories. In this instance, the module 228 allows for analysis of operations pertaining to records that exist in the storage layer 230. Accordingly, the analysis module 228 includes a list of operations: unchanged, adds, updates, renames, deletes. Upon execution, the analysis module 228 searches record deltas in the buffer 234 for corresponding operations (e.g., operation commands, operation indicators, etc.). The analysis module 228 may allow for display of search results in a tabular or other form as indicated by statistics 229. An administrator or other user of such an exemplary metadirectory may execute such an analysis module to determine what operations may occur or have occurred. Such statistics may allow an administrator or other user to manage the exemplary metadirectory more effectively.

Figure 5:
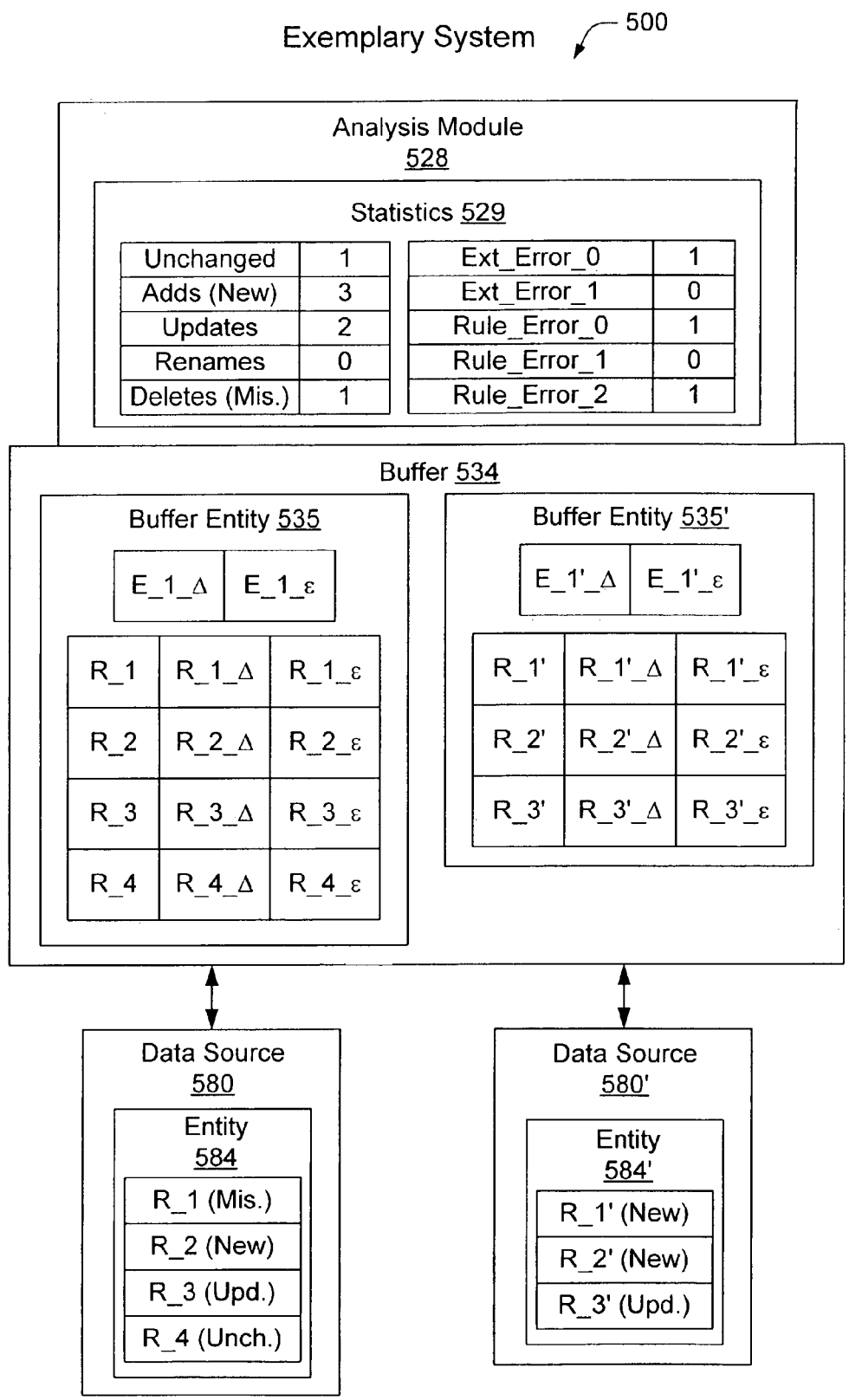
FIG. 5 is a block diagram of an exemplary system that includes a plurality of data sources and an exemplary metadirectory that associates change and error information with entities and/or records in a storage layer.

FIG. 5 shows another exemplary system 500 that includes an analysis module 528, a buffer 534 and a plurality of data sources 580, 580'. The data source 580 includes an entity 584 and the data source 580' includes an entity 584'. The entity 584 includes four records and the entity 584' includes three records. Each of the records includes information pertaining to one or more directories. Further, such information may indicate a desired change event (e.g., an operation, operations, value, values, etc.). In these examples, change information and error information are shown on a record level and on an entity level (e.g., $E\_1\_\Delta$, $E\_1\_\epsilon$, $E\_1'\_\Delta$, $E\_1'\_\epsilon$). Of course, depending on need or desires, change and/or error information may be included for one or more levels as appropriate. In general, if change information on an entity level indicates "add" or "new" (e.g., includes the operation command "add"), then the change information on the record level will indicate "add" or "new"; if change information on an entity level indicates "delete" (e.g., includes the operation command "delete"), then change information on the record level may not be present or may indicate "delete" or "missing"; and if the change information on an entity level indicates "modify" (e.g., includes the operation command "modify"), then the change information on the entity level may be specific on an attribute-by-attribute or other basis. Of course, other scenarios, indicators and/or commands may be possible.

As shown with respect to the exemplary system 200 of FIG. 3, a read module may execute locally or remotely that causes communication of information from a data source to a storage layer of an exemplary metadirectory. In the exemplary system 500, one or more read modules have been executed to thereby generate two buffered entities 535, 535'. During execution of the one or more read modules, errors may occur. For example, one or more errors may occur with respect to an extension, a rule, etc. Such errors may be record specific, entity specific, directory specific, etc. Where appropriate, error indicators are associated with an entity, a record, etc.

In the example shown, the error indicators on the record level are associated with individual records and labeled $R\_1\_\epsilon$, $R\_2\_\epsilon$, $R\_3\_\epsilon$ and $R\_4\_\epsilon$ for the buffered entity 535 and $R\_1'\_\epsilon$, $R\_2'\_\epsilon$ and $R\_3'\_\epsilon$ for the buffered entity 535'. The error indicators are additional information associated with records and/or entities, for example, in any of the manners described above with respect to deltas. Hence, an entity may be an object wherein one or more error indicators, as appropriate, are associated with the object. An exemplary metadirectory stores error information (e.g., error indicators, other error information, etc.) as XML text directly on an object. Of course, other manners exist to associate error information and directories, entities, records, etc. As described herein, various exemplary metadirectories associate directory information and error information in a storage layer. Again, "storing on an object" refers to defining the object to include the additional information and/or associating the additional information with information (e.g., names, values, etc.) pertaining to the object.

In the exemplary system 500, a services layer includes an exemplary analysis module 528 suitable for execution on a service engine (see, e. g., the engine 224 of FIG. 4). The exemplary analysis module 528 allows for analyzing change events or operations and/or errors that pertain to one or more directories. In this instance, the module 528 allows for analysis of operations and errors pertaining to entities and/or records that exist in the buffer area 534. Accordingly, the analysis module 528 includes a list of operations for entities and/or attributes, as appropriate (e.g., unchanged, adds, updates, renames, deletes). Of course, an analysis module may be directed to locate operations instead of including some predefined list. Upon execution, the analysis module 528 searches entity and/or record deltas and error information in the buffer 534 for operations (e.g., operation commands, operation indicators, etc.) and errors. The analysis module 528 may allow for display of search results in a tabular or other form as indicated by statistics 529. An administrator or other user of such an exemplary metadirectory may execute such an analysis module to determine what operations may occur or have occurred and/or to determine what errors may occur or have occurred. Such statistics may allow an administrator or other user to manage the exemplary metadirectory more effectively.

While aforementioned examples pertain generally to communicating directory information to an exemplary metadirectory, such a metadirectory may perform additional services where delta, error and/or other information associated with directory information allows for services and benefits not found in traditional metadirectories. In general, exemplary services extend beyond simple tabulation or simple census gathering. For example, exemplary analysis services may determine associations, relationships, etc., for one or more entities and/or one or more records based on entity information and/or record information, wherein additional information such as, but not limited to, change information, error information and/or state information are present.

An exemplary analysis service may provide a user interface that allows a user to view and/or interact with information. For example, such a service may operate through a server that can access an information database. In one example, an exemplary analysis service provides a user interface that can search information in a SQL database (e.g., maintained by/on a server). Such an exemplary analysis service optionally relies on APIs to access and/or search information related to one or more entities and/or one or more attributes. Such an exemplary analysis service optionally relies on information organized in columns of an SQL database wherein individual rows optionally correspond to an entity and/or an attribute and wherein additional information is optionally provided in a same or in an associate row. Of course, other forms of information organization are possible.

Figure 6:
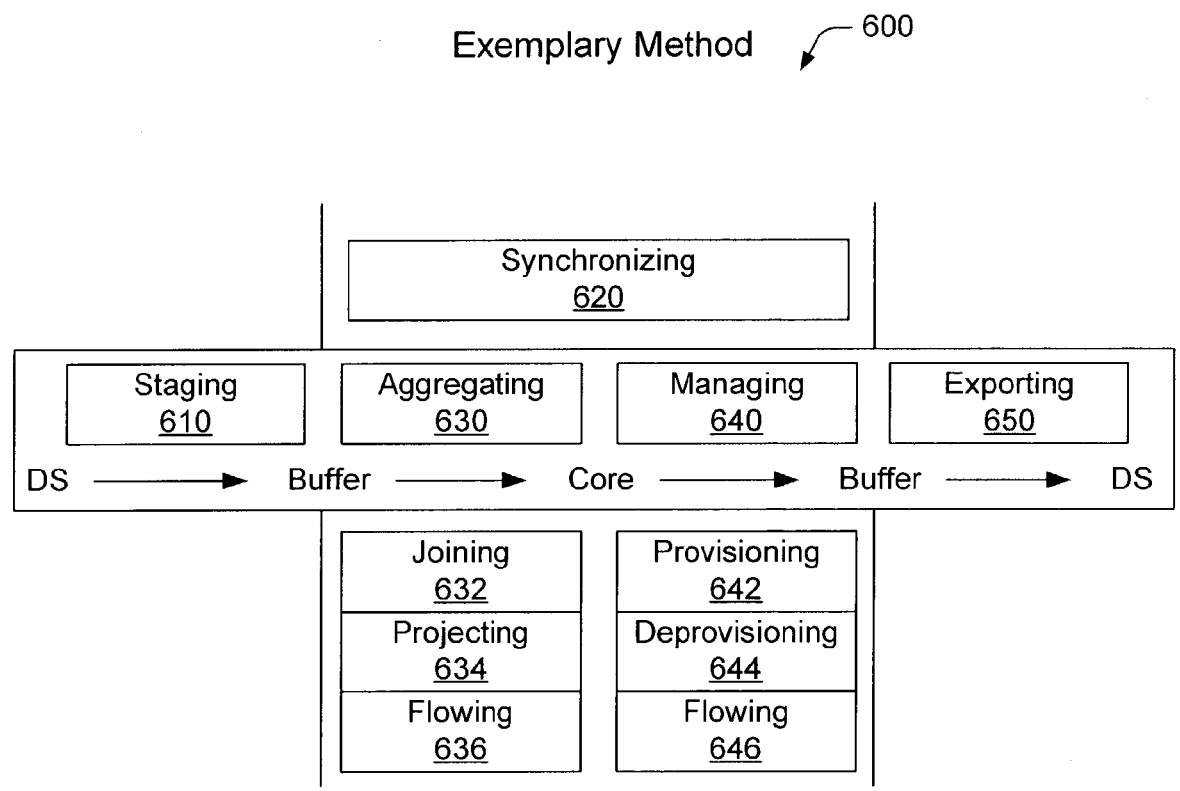
FIG. 6 is a block diagram of an exemplary method of processing information in an exemplary metadirectory.

FIG. 6 shows an exemplary method 600 wherein directory information travels from left to right with respect to various processes. The exemplary method 600 includes three main processes staging 610, synchronizing 620 and exporting 650. Staging 610 includes communicating directory information from one or more data sources (DS) to a metadirectory. Synchronizing 620 includes aggregating 630 information and/or account managing 640 information with respect to a core and a buffer of a metadirectory. Exporting 650 includes communicating directory information from a metadirectory to one or more data sources (DS).

Aggregating 630 may include sub-processes such as joining 632, projecting 634 and flowing 636. Aggregating 630 acts to aggregate information in a metadirectory wherein the information pertains to one or more directories used in one or more data sources. Joining 632 may aid in aggregating 630. Joining 632 typically aims to join information. Joining 632 may join information in a buffer area, in a core area and/or between a buffer and a core area. For example, joining 632 may establish a link between an object in a core area and an object in a buffer area. Such a process may also act to establish a link between an object in a core area and/or a buffer area and an object in one or more data sources. Joining 632 may operate automatically and/or interactively according to rules and/or specifications and/or according to an administrator's commands. Further, joining 632 does not necessarily include any changing of attribute values. Joining 632 operates primarily to establish links or relationships between entities, records, etc. (e.g., storage layer entities).

Projecting 634 can operate to create storage layer entity in a core on the basis of a storage layer entity in a buffer; projecting 634 may also act to establish a link between the created and the already existing storage layer entity. Projecting 634 may be performed as an object-level operation. Projecting 634 does not necessarily include any changing of attribute values.

Flowing 636 can operate to change directory information in core area of an exemplary metadirectory. Flowing 636 typically relies on a link established between an entity in a buffer and an entity in a core. Further, flowing 636 generally operates at the level of attribute values. Another flowing process 646 may act to change directory information in a buffer based on information in a core.

Account managing 640 in this instance is used to refer to managing aggregated information in a metadirectory. Account managing 640 may be initiated by any change to information in an entity in a core of the metadirectory, sometimes with the exception of a deletion. In general, account managing 640 evaluates whether changes to a core entity require updates to a buffer entity. Further, account managing 640 typically occurs based on entity level operations, which may have subsequent effect on one or more attribute levels. Of course, other operational schemes are possible. In the example of FIG. 6, a buffer entity that requires and/or receives changes may be flagged to aid in exporting 650. Exporting 650 is typically a push process that relies on flagged buffer entities to update directory information in one or more data sources. Managing 640 may include sub-processes such as provisioning 642, deprovisioning 644 and flowing 646.

Provisioning 642 may be triggered when changes are applied to one or more entities in core area of an exemplary metadirectory. Provisioning 642 may create a buffer entity and optionally a link between a core entity and the created buffer entity. Provisioning 642 may rename a entity, a record, etc., particularly one that resides in buffer area of an exemplary metadirectory. Provisioning 642 may disconnect a link between a core entity and a buffer entity.

Deprovisioning 644 may determine how a metadirectory processes certain buffer entities. For example, deprovisioning 644 may keep a buffer entity in buffer area or delete it from buffer area. Of course, deprovisioning 644 may flag a buffer entity as "deleted," which may subsequently initiate a delete operation on the entity. Flowing 646, as already mentioned, may act to change directory information in a buffer based on information in a core of a metadirectory.

Exporting 650 may examine entities in buffer area of a metadirectory (e.g., for those flagged as pending export) and then act to communicate update information to one or more data sources, as appropriate.

The various processes described in the exemplary method 600 may be considered services of an exemplary metadirectory. As such, the various processes may exist as service modules suitable for execution on a service engine. The various processes may also be used to define information states. For example, as already explained, information typically travels from left to right in the exemplary method 600. During execution of the exemplary method, information may change. For example, a record may be deleted or added, a record value may change, a delta may change, etc. Further, one or more errors may be generated for a particular entity, record, etc. Therefore, various exemplary metadirectories include a state indicator to relate directory information with one or more states.

Figure 7:
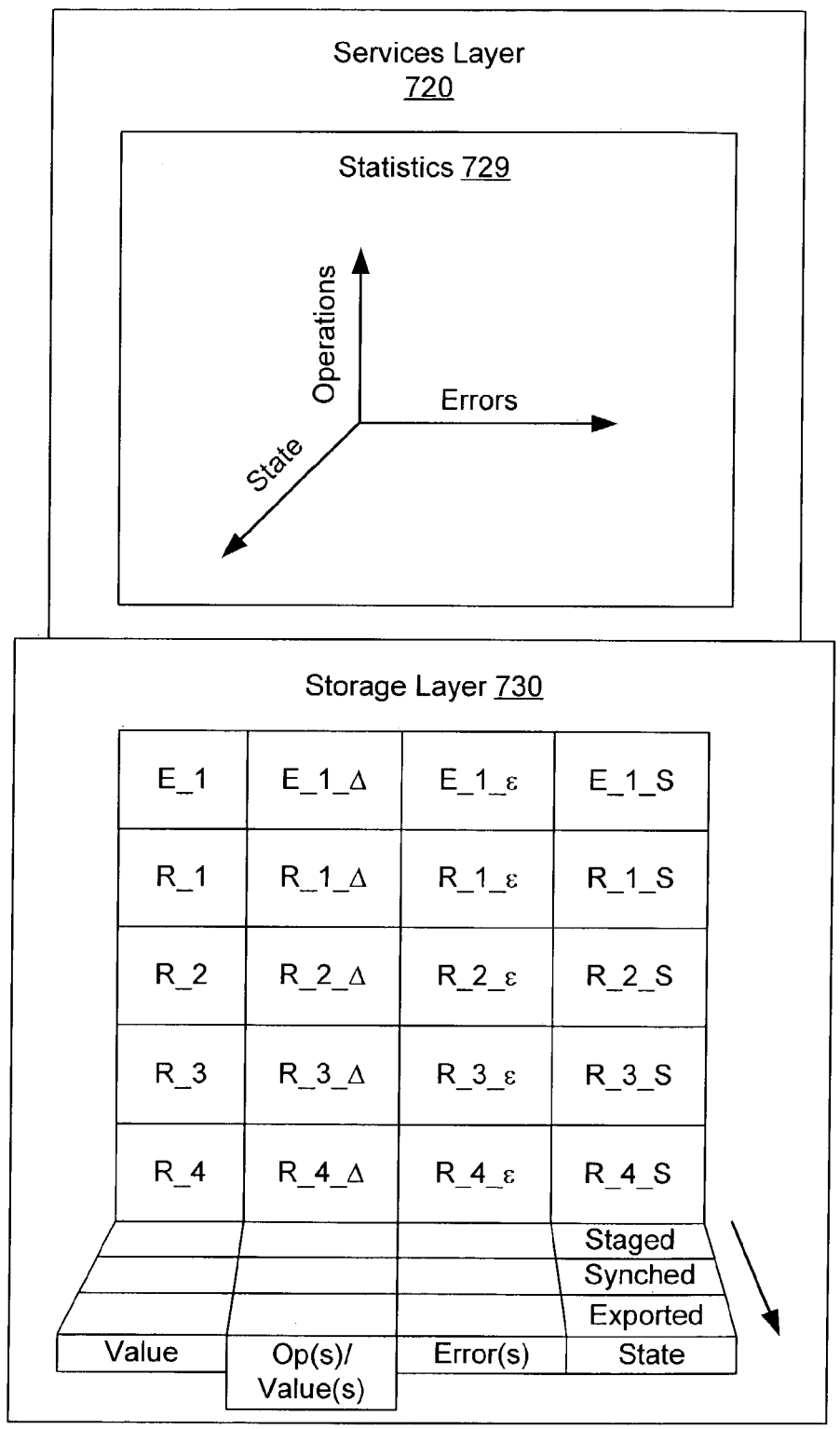
FIG. 7 is a block diagram of an exemplary services layer and an exemplary storage layer that associate change, error and/or state information with entities and/or records in a storage layer.

FIG. 7 shows an exemplary metadirectory 700 that includes a services layer 720 and a storage layer 730. The storage layer 730 includes an entity and various records associated with additional information. For example, at the entity level, entity E_1 has associated delta or operation information $E\_1\_\Delta$, associated error information $E\_1\_\epsilon$ and/or associated state information $E\_1\_S$; whereas, at the record level, record R_1 has associated delta or operation information $R\_1\_\Delta$, associated error information $R\_1\_\epsilon$ and/or associated state information $R\_1\_S$. Such additional information is optionally associated with appropriate directory information as described above. Further, such information may be stored for one or more states. For example, an object having an attribute represented by record R_1, may have associated error information for staging, synchronizing and/or exporting. In the service layer 720, a service module may execute on a service engine to provide statistics for one or more such objects. An exemplary three-dimensional plot is shown wherein state information, operation information and error information form axes. Of course, any of a variety of analyses or representations may be possible. An administrator or other user of such an exemplary metadirectory may execute such an analysis module to determine what operations may occur or have occurred and/or to determine what errors may occur or have occurred and to determine what operations and/or errors are associated with particular states. Such statistics may allow an administrator or other user to manage the exemplary metadirectory more effectively.

State information can allow for administration of an exemplary metadirectory in a state-based manner. State-based administration can be particularly beneficial when information is received from a plurality of data sources and such information pertains to common entries in directory hierarchies of the plurality of data sources. As described with reference to FIG. 6, an exemplary metadirectory may allow for staging, synchronizing and exporting. Such processes may define states and benefit from state information. For example, staging may compare incoming information with information already staged in a buffer area (e.g., a connector space). With state information, the staging process can ascertain the state of information staged in a buffer area and make appropriate decisions to ensure that appropriate processing proceeds only on information that has not been processed.

With state information, synchronizing may differentiate between information updates and information that has already been processed via a synchronizing process. Such an exemplary metadirectory allows for both processing updates only and reprocessing a complete set of information available for an object, as appropriate, e.g., based on requirements of a synchronizing process. As long as there are no changes applied to synchronization logic it is usually sufficient to process only incoming updates for subsequent process runs. Noting that changes applied to the synchronization logic may require a complete set of information to be reprocessed because the changes may produce different synchronization results.

Exporting may also benefit from state information. In general, exporting pushes out information that may be flagged and/or staged for export to one or more data source. In some instances, such flagged and/or staged information includes information that has not been pushed out as well as information that requires a push out retry. To be efficient exporting should only attempt to apply only the required minimum amount of information to a data source. For example, a minimum amount of information may relate to an update for a single attribute of a directory.

An exemplary metadirectory accomplishes state-based administration by storing a combination of a complete representation of information for an object in a buffer area and associated delta information as required to calculate each state of a metadirectory process (e.g., staging and sub-processes, synchronizing and sub-processes, exporting and sub-processes, etc.).

In an exemplary metadirectory, a complete representation of information for an entity or object is referred to as a "hologram" while change or delta information for the object is referred to as a "delta". Further, using this terminology, application of a delta to a hologram results in another hologram, which may be referred to as a post-process hologram. The hologram prior to application of the delta may be referred to as a pre-process hologram. Thus, a "triple" may be formed by a pre-process hologram, a delta and a post-process hologram.

State-based representation of information in form of holograms and deltas has many advantages making metadirectory processes more efficient. For example, such a representation may allow for dividing processes into independent sub-processes that can focus on areas where changes are very likely. State-based representation of information may reduce the amount of data processed during a process. State-based representation of information may allow for requests of information from a data source at any time without generating a need to immediately process the information. State-based representation of information can allow for processing of information at any time and changes can be applied to synchronization logic without requesting information from associated data sources. State-based representation of information can allow for required updates to be pushed out to a data source at any time wherein only those changes that are required to be pushed out are applied to the data source.

An exemplary metadirectory maintains state-based information for inbound and outbound processes. For example, such a metadirectory may maintain triples for inbound objects and for outbound objects. Inbound information can encompass all information that has been imported from a data source and outbound information can encompass all required information associated with information that has been pushed out to a data source.

In an exemplary metadirectory, to determine all subsequent deltas for various states, the exemplary metadirectory maintains a complete set of information representing an object in a data source (e.g., a hologram). The hologram is the representation of an object in the data source that was used as input for a successful run of a synchronization process and it is stored with a staging object (e.g., an entity in a buffer area of the exemplary metadirectory). The hologram enables the exemplary metadirectory to determine whenever new information arrives for an object from the data source, the components that are new (that is, the information that has not been processed by the synchronization process). In this example, the corresponding delta to the hologram is called a "delta pending import" and is stored with the staging object (e.g., an entity in the buffer of the exemplary metadirectory).

The information stored in the hologram and the delta pending import is used to generate a triple, for example to calculate the representation of an object in the data source that encompassed all the information that was received for this object from the data source. In this example, the resulting hologram is known as "pending import hologram". Hence, the triple include the hologram, the delta pending import and the pending import hologram. This particular triple is state-based and may be stored as an object in a buffer area of the exemplary metadirectory. Such an object is also a representation of the information in the data source after the next successful run of the synchronization process and as such it represents the future hologram of the information (e.g., assuming that information from another data source does not trump the change information upon export from the metadirectory).

With respect to outbound processes, the concept of holograms and deltas may be used to represent the state of outbound information in conjunction with a given object in a data source. Outbound state information may help to assure that only information that needs to be pushed out to a data source is pushed out. According to an exemplary metadirectory, there are three different export states with corresponding state-based information: (i) information that is supposed to be pushed out to a data source but has not been part of the export process yet; (ii) information that is in the process of being pushed out to a data source; (iii) information that has been pushed out to a data source successfully but not yet confirmed by import. Each export state has corresponding delta and hologram pairs that may allow calculation of an object representation in the data source for each state. Again, given a pre-process hologram and a delta, a post-process hologram and hence a triple may be generated.

Referring again to various processes described with respect to the exemplary method of FIG. 6, an account managing process may result in new information that is supposed to be pushed out to a data source. In an exemplary state-based metadirectory, such a process may calculate delta information that needs to be staged on a staging object for a subsequent export run. Such delta information may be referred to as a "delta unapplied export".

An export process may attempt to push out information to a data source. In such a situation, information of the delta unapplied export that are processed during the export operation are transitioned into a different delta called a "delta escrowed export". The difference between the delta unapplied export and the delta escrowed export is the fact that information of the delta unapplied export has never been part of an export process.

If a call-based management agent is used to communicate with a data source, the communication is typically on the basis of APIs implemented by the data source. In such a situation, an exemplary metadirectory receives a notification in the form of a return value that indicates whether or not the export process was successful. Information of the delta escrowed export for which a success notification was received may be transitioned into a data structure called "delta unconfirmed export". Thus far, the three export state-related deltas are (i) the delta unapplied export; (ii) the delta escrowed export; and (iii) the delta unconfirmed export. Each delta allows the calculation of a corresponding hologram representing an object in a data source in a specific state and may encompass all information an exemplary metadirectory has about an object (e.g., an entity in a directory of a data source).

Outbound state information may also be adjusted by a staging process. For example, information in a new delta pending import can be removed from a delta unconfirmed export or delta escrowed export. Since this information was received from a data source the information does not need to be further tracked for consecutive export processes.

The section above concerning inbound state information introduced the pending import hologram as a compiled view of an object in a data source based on all information that was received for the object. The delta unconfirmed export represents the information that was successfully pushed out to the object. However, this information has not yet been imported. The combination of pending import hologram and delta unconfirmed export results in a hologram representing the complete object in a data source, for example, as it appears on the basis of the information known by the exemplary metadirectory for the particular object (e.g., entity of a directory in a data source). In an exemplary state-based metadirectory, such a representation may be referred to as a "unconfirmed export hologram", which may be generated by a corresponding triple.

On the basis of the unconfirmed export hologram and the delta information that is involved in a process of being pushed out to a data source (delta escrowed export) it is possible to calculate in another triple the state of an object in the data source representing the resulting object when these changes have been successfully applied to the object (e.g., an entity in a directory in a data source). In this situation, the corresponding hologram may be referred to as an "escrowed export hologram".

The escrowed export hologram is a representation of an object in a data source that encompasses: (i) all information that was received by an exemplary metadirectory for the object; (ii) all information that has been successfully pushed out to the object by an exemplary metadirectory; and (iii) all information that is in the process of being pushed out to the object by an exemplary metadirectory. With the escrowed export hologram and the delta unapplied export representing the information that is stored on a staging object (e.g., a entity in a buffer area of an exemplary metadirectory) for the next export process, it is possible to calculate the future representation of an object in a data source under the assumption that the information that is waiting to be pushed out has been successfully applied to the object. In this situation, the corresponding state-based hologram may be referred to as an "unapplied export hologram".

Thus far, the following four triples have been mentioned: (i) the unapplied export triple; (ii) the escrowed export triple; (iii) the unconfirmed export triple; and (iv) the pending import triple. These four triples may form a structure that may be referred to as a "synchronization tower". An exemplary metadirectory may build a synchronization tower in memory whenever it is necessary to calculate a specific state of an object or to update delta information. In instances where inbound and outbound information (e.g., information pertaining to an entity in a directory in a data source) are correlated to each other, the synchronization tower should be calculated from bottom to top to determine any associated holograms and/or deltas. For example, a tower order may include, from bottom to top, a pending import triple, a confirmed export triple, a escrowed export triple, and an unapplied export triple. The existence of such a tower may lead to a reduction in information storage requirements. For example, given such a tower, an exemplary metadirectory may choose to store only a pre-process hologram and the various state-related deltas (e.g., a pending import delta, a confirmed export delta, an escrowed export delta and an unapplied export delta). The hologram and the deltas may be stored on an object in a buffer area (e.g., a connector space) of an exemplary metadirectory. In other words, an object in an exemplary metadirectory may be defined to include a hologram and various deltas wherein the deltas correspond to process states. In this manner, an exemplary metadirectory may reduce or otherwise minimize the amount of information stored with, in or on a staging object (e.g., an entity in a buffer) by only storing the hologram and all available delta information. In many instances, such information is sufficient to determine the different states of an object in a data source. For example, an unapplied export hologram, an escrowed export hologram and an unconfirmed export hologram may provide previews of an object in a data source assuming that export information has been persistently applied to it and the information that is in process of being pushed out or planned to be pushed out will be eventually successfully applied to it.

Figure 8:
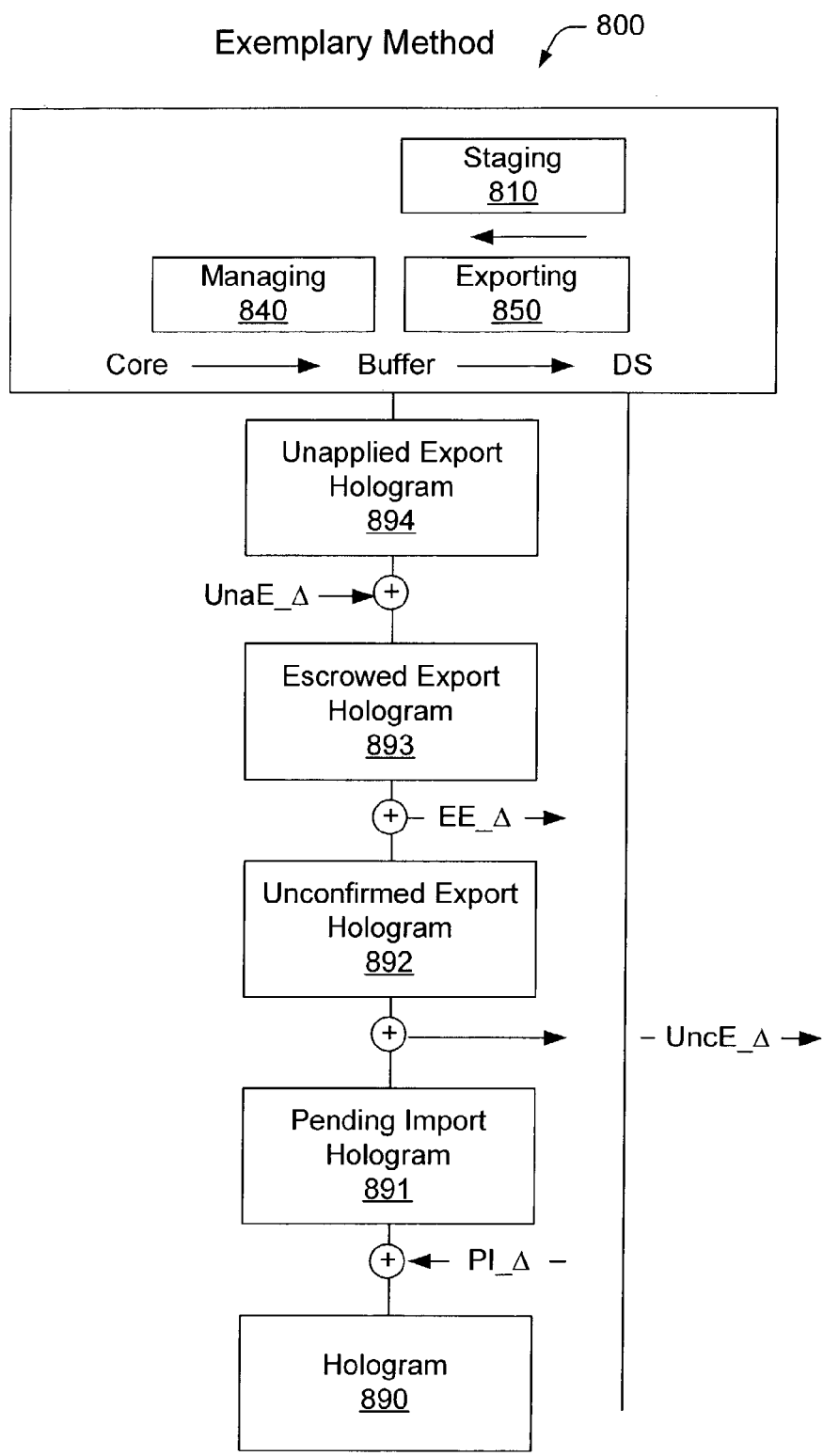
FIG. 8 is a block diagram of an exemplary method of using state-based information.

FIG. 8 shows an exemplary method 800 that includes holograms and deltas. The exemplary method 800 includes various processes as referenced in the exemplary method 600 of FIG. 6, including staging 810, managing 840 and exporting 850. Core and buffer area of an exemplary metadirectory are shown along with arrows indicating that the staging 810 communicates information from a data source to a buffer, that the managing 840 (e.g., account managing) communicates information from a core to a buffer, and that the exporting 850 communicates information from a buffer to a data source. The holograms are shown from bottom to top as a hologram 890, a pending import hologram 891, an unconfirmed export hologram 892, an escrowed export hologram 893 and an unapplied export hologram 894. Note that corresponding deltas (e.g., PI_$\Delta$, UncE_$\Delta$, EE_$\Delta$ and UnaE_$\Delta$) are also shown in relationship to the holograms. Overall, the exemplary method 800 demonstrates the use of state-based delta information and state-based information that relates to an entity (e.g., an object) of a directory. As described above, state-based error information may accompany the state-based information.

State-based information may be updated by any particular process or sub-process in an exemplary metadirectory. For example, staging may determine a delta pending import (e.g., PI_$\Delta$) of information that was received from a data source. In addition, a delta pending import (e.g., PI_$\Delta$) includes new delta information suitable for use in updating a delta unconfirmed export (e.g., UncE_$\Delta$) and a delta escrowed export (e.g., EE_$\Delta$) of an object in a buffer area of an exemplary metadirectory (e.g., a staged object in a connector space).

In this exemplary scenario, information received from a data source may also help to confirm information that was pushed out to an object in the data source. Although it may be possible to get in a call-based management agent case a success notification for pushed out changes, the notification does this not answer the question as to whether those changes have been applied persistently to a particular object. For example, a possibility exists that another process in the data source may be applying changes to information that was changed by a metadirectory process. Hence, importing pushed out changes from a data source may serve as an indicator that changes were applied persistently to a particular object.

As described with respect to the exemplary method 600 of FIG. 6, synchronizing may include sub-processes of aggregating and account managing. Each of these sub-processes can have an impact on any of a variety of associated state-based information. Aggregating may process information of a staged object (e.g., an object in a buffer) wherein the information was received from a data source. Since the hologram (e.g., the hologram 890 of FIG. 8) represents an object in a data source that was used as input for the aggregating, the hologram should be updated and an available delta pending import (e.g., PI_$\Delta$) should be cleared after a successful run of this particular aggregating process. Hence, account managing may result in updates that should be pushed out to a data source. Such changes should be staged on a staged object for a subsequent (e.g., the next) export run (e.g., exporting). In other words, a state-based object should be defined in a manner that allows such changes to be incorporated in an object stored in a buffer of an exemplary metadirectory. This task may be accomplished by updating an unapplied export delta (e.g., UnaE_$\Delta$) on a staged object.

In general, exporting impacts the three export related deltas: (i) unapplied export delta (UnaE_$\Delta$); (ii) escrowed export delta (EE_$\Delta$); and (iii) unconfirmed export delta (UncE_$\Delta$). Each of these deltas represent different states of information that can flow from an exemplary metadirectory to a data source.

Updating inbound state-based information, which typically encompasses all information for an object received from a data source, may also be performed in conjunction with one or more metadirectory processes. In general, inbound state-based information includes: (i) information received that has been used as input to an aggregating process; and (ii) new delta information that is waiting to be applied by an aggregating process. Inbound state-based information may be changed by a staging process and/or a synchronizing process. For example, staging may change a pending import delta (e.g., PI_$\Delta$) and synchronizing may change a hologram and a pending import delta (e.g., PI_$\Delta$).

An exemplary metadirectory typically determines a delta for information received from a data source, wherein the information has not been internally further processed on the basis of a hologram (e.g., base hologram 890) stored on a staged object (e.g., wherein the object is defined to include a hologram). When an exemplary metadirectory requests information from a data source, the corresponding process may limit the information to information that matches corresponding object types. For example, such corresponding object types may be specified in a list of designated object types and attributes in an attribute inclusion list. Further, an exemplary metadirectory may build and store (e.g., in a buffer area and/or in a core area) an "import image" for each object that was received from a data source. In the instance that such an import image does not have a corresponding staged object, then the import image may be stored in a buffer area (e.g., a connector space) of an exemplary metadirectory. An exemplary metadirectory may then determine a pending import delta (PI_$\Delta$) for a staging process by comparing the import image with a corresponding hologram (e.g., hologram 890) of the staged object, wherein the pending import delta (PI_$\Delta$) is the difference between the hologram and the import image. In this example, a staging process may store the pending import delta (PI_$\Delta$) with the staged object and set a flag on the object if new pending information is available. In other words, an object may be defined to include a state-based delta and/or one or more flags wherein delta information may be included in the object definition and hence stored in association with the object.

Inbound updates may be applied by a synchronizing process. In general, an exemplary metadirectory may include two different types of synchronizing processes: (i) delta synchronizing; and (ii) full synchronizing. In such an exemplary metadirectory, a major difference between the two synchronizing types is that only staged objects with attributes that have not been processed are part of the delta synchronizing. Thus, only those objects with a pending import delta (PI_$\Delta$) are processed, whereas in the in case of a full synchronization all attributes as they exist in a pending import hologram (e.g., pending import hologram 891 of FIG. 8) are processed. As already mentioned, a synchronizing process may include sub-processes such as aggregating and account managing. In an exemplary synchronizing, aggregating may be the first sub-process initiated. In general, only the aggregating process is relevant to the inbound state of a staged object. In the case that no errors (e.g., fatal errors, unacceptable errors, etc.) arise during the aggregating, pending import delta (PI_$\Delta$) information is cleared and the hologram (e.g., the hologram 890) is replaced with the pending import hologram (e.g., the pending import hologram 891). In general, a pending import hologram is calculated as needed, without any specific requirement to store the pending import hologram with a staged object.

In an exemplary metadirectory, state-based holograms and deltas may also be used to assure that only information that needs to be pushed out to a data source is pushed out. There are three different export states in conjunction with a staged object: (i) unapplied export state; (ii) escrowed export state; and (iii) unconfirmed export state. Outbound state-based information may be changed by a staging process, a synchronizing process and/or an exporting process. For example, staging may change an unconfirmed export delta (UncE_$\Delta$) and/or an escrowed export delta (EE_$\Delta$); synchronizing (e.g., account managing) may change an unapplied export delta (UnaE_Δ); and exporting may change an unconfirmed export delta (UncE_Δ) and/or an escrowed export delta (EE_Δ).

Outbound state information may be adjusted by a staging process. A new pending import delta (PI_Δ) may be removed on the basis of an unconfirmed export delta (UnaE_Δ) or an escrowed export delta (EE_Δ). In general, such information received from a data source does not necessarily need to be further tracked for consecutive exporting processes.

Outbound state information may be adjusted by an account managing process, which is typically part of a synchronizing process, via updating outbound state-based information on a staged object. A staged object may be an object defined to include state-based information wherein the object is used by an exemplary metadirectory to store information in a buffer area.

When new information, that is supposed to be pushed out to a data source, is generated during account managing, a representation of the information may be created as "export image". Such an image may be stored in a core and/or in a buffer of an exemplary metadirectory. The export image may be compared to an escrowed export hologram (e.g., the escrowed export hologram 893), which typically represents an object in a data source that includes: (i) all information for the object that was received from the data source; (ii) all changes that have been already pushed out to the data source; and (iii) all changes that are in the process of being pushed out to the data source. An escrowed export hologram may be determined in its relationship to a synchronization tower, wherein, for example, the difference between the export image and the escrowed export hologram is contained in the unapplied export delta (UnaE_Δ) that should be staged on the staged object for a subsequent (e.g., the next) exporting process.

Outbound updates may be applied by an exporting process. For example, when an exporting process starts, the following steps may occur:

1) Escrowing of unapplied deltas wherein the unapplied deltas are pushed down to escrowed for all objects within a data source agent's partition (e.g., a storage and/or namespace in an exemplary metadirectory) which have unapplied export delta (UnaE_Δ) not equal to none and escrowed export delta (EE_Δ) equal to none.

2) Searching for objects to export wherein a search occurs for all objects which have escrowed export delta (EE_Δ) not equal to none and wherein these are the objects to be exported.

In this example, as changes to objects are processed the following handling is important to note:

1) For call based management agents, when an object creation is exported, escrowed export deltas (EE_Δ) are verified. In addition, at this point the management agent may supply an anchor or an updated DN of a new object in a directory of the data source, which may be noted on a corresponding object in a buffer of an exemplary metadirectory (e.g., in a connector space). In other words, an object may be defined to exist in a buffer and to include such information.

2) In all other cases, the change remains in an escrowed state while the run is in progress, which may improve efficiency.

At the end of a run the following may occur:

1) When the execution of a call based management agent completes successfully, all escrowed changes on objects under this partition (e.g., a storage and/or namespace in an exemplary metadirectory) are logically pushed to confirmed.

2) In the case entity based management agents or a stopped/failed call based management agent runs, all escrowed changes remain in an escrowed state.

An example for generating a synchronization tower follows. In general, a synchronization tower is generated to ensure that only information that requires processing is ultimately processed. In this example, an exemplary metadirectory applies new information to staged objects.; information is communicated information from a data source to the exemplary metadirectory using a call-based management agent (e.g., a service module); and attributes A, B, and C are part of an attribute inclusion list.

To generate a synchronization tower prior to aggregating, a new image is received from the data source. As part of the staging process, the exemplary metadirectory determines which part of this image needs to be staged for further processing. For example, wherein attribute values of the new imported image are A=4, B=3, C=4; the new imported image includes A=4, B=3, C=4; the hologram includes A=4, B=2, C=4 (e.g., the hologram 890); and the pending import delta (PI_Δ) includes the information operation command "add" and B=3 and operation command "delete" and B=2. The comparison of the new imported image with the hologram results in a pending import delta (PI_Δ) having an attribute value of B=3 because this is the only attribute has associated new information.

After staging the new pending import delta (PI_Δ), the exemplary metadirectory may merge an escrowed export delta (EE_Δ) into an unconfirmed export delta (UncE_Δ), thereby clearing the escrowed export and/or "pruning" out the portion of the unconfirmed export delta (UncE_Δ) which has been confirmed by import.

In this example, the aforementioned processes may be presented as follows, assuming that the escrowed and unconfirmed portions of the export tower appear as:

| | |
|---|---|
| Unconfirmed export delta (UncE_Δ): | "add" B = 3, "delete" B = 2 |
| Unconfirmed export hologram (e.g., 892): | A = 4, B = 3, C = 4 |
| Escrowed export delta (EE_Δ): | "add" A = 5, "delete" A = 4 |
| Escrowed export hologram (e.g., 893): | A = 5, B = 3, C = 4 |

Accordingly, the merging process would yield:

| | |
|---|---|
| Unconfirmed export delta (UncE_Δ): | "add" B = 3, "delete" B = 2, "add" A = 5, "delete" A = 4 |
| Unconfirmed export hologram (e.g., 892): | A = 5, B = 3, C = 4 |
| Escrowed export delta (EE_Δ): | none |
| Escrowed export hologram (e.g., 893): | A = 5, B = 3, C = 4 |

The pruning process can thereby result in removing changes in the unconfirmed export delta (UncE_Δ) that have already been confirmed in the pending import. In this particular example, "add" B=3, "delete" B=2 has been confirmed by import. The result of this pruning would be:

| | |
|---|---|
| Unconfirmed export delta (UncE_Δ): | "add" A = 5, "delete" A = 4 |
| Unconfirmed export hologram (e.g., 892): | A = 5, B = 3, C = 4 |
| Escrowed export delta (EE_Δ): | none |
| Escrowed export hologram (e.g., 893) | A = 5, B = 3, C = 4 |

In this example, there is a still a portion of the delta that should have been exported to the data source, but has not been applied. In the case of a full import run, a "change-not-reimported" warning may be reported immediately. In the case of a delta import run, if subsequently deltas do not come in which confirm the remaining delta, at the end of the run a "change-not-reimported" warning may be reported.

In the above example, the exemplary metadirectory may be in the process of pushing out data to a data source. As such, a new export image for a staged object may be available as the result of the account managing process:

| | |
|---|---|
| Attributes of the new export image: | a = 5, b = 3, c = 2 |
| Unconfirmed export hologram (e.g., 892): | A = 4, B = 3, C = 9 |
| Escrowed export delta (EE_Δ): | "add" A = 5, "delete" A = 4 |
| Escrowed export hologram (e.g., 893): | A = 5, B = 3, C = 9 |

In this example there are no changes to the escrowed export delta (EE_Δ).

The exemplary metadirectory may now determine a new unapplied export delta (UnaE_Δ) on the basis of the escrowed export hologram (e.g., the escrowed export hologram 893 of FIG. 8) and the new image as follows:

| | |
|---|---|
| Escrowed export hologram (e.g., 893): | A = 5, B = 3, C = 9 |
| New export image: | A = 5, B = 3, C = 2 |
| Unapplied export delta (UnaE_Δ): | "add" C = 2, "delete" C = 9 |

In a subsequent process, the exemplary metadirectory may determine an unapplied export hologram (e.g., the unapplied export hologram 894 of FIG. 8) and determine whether the unapplied export delta (UnaE_Δ) needs to be adjusted.

A similar process or set of determinations occur in the case of a new export image as a result of synchronizing process. In this case, an exemplary metadirectory may determine holograms and/or deltas of a tower up to the escrowed export hologram to in order to determine a new unapplied export delta (UnaE_Δ). In general, determinations with respect to a tower are performed from bottom level to a higher level.

In another example, a staging process within a specific connector space (e.g., a partition of a buffer) might change all deltas of the staged objects for which an exemplary metadirectory has received updates from a data source. In yet another example, an exporting process within a specific connector space (e.g., a partition of a buffer) might change all export deltas of the staged objects for which an exemplary metadirectory has received updates from a data source. Yet further, in an example involving a synchronizing process, such a process may change the unapplied export delta (UnaE_Δ) of all staged objects in all connector spaces (e.g., in a buffer) to which changes are applied as a result of this process.

In the various foregoing examples, an exemplary metadirectory may determine a synchronization tower to determine one or more required updates. Accordingly, such an exemplary metadirectory only needs to store the hologram and all of the deltas (e.g., PI_Δ, UncE_Δ, EE_Δ, UnaE_Δ) with a staged object (e.g., a buffer entity).

Below, a VISUAL BASIC® software (Microsoft Corporation, Redmond, Wash.) script ("checkImportDeletions.vbs") shows how a user can use staging information to determine a ratio of pending import deletes to the rest of the delta. This particular exemplary script can cause display of statistics and also can also return set an exit status to error if the ratio is higher than a target percentage that is passed in. This exemplary script could be called by another script to help decide whether to perform a synchronization run or instead alert a system administrator to investigate why so many deletions exist. The exemplary script includes various functions including: "DisplayUsage" for general display and usage (also includes two examples); "ParamValue" for parsing a command line for an argument and returning the value of the argument; and "ParamExists" for parsing a command line for an argument and returning "true" if the argument exists.

```
'EXEMPLARY SCRIPT:   checkImportDeletions.vbs
'= Copyright (C) 2003 Microsoft Corporation. All rights reserved.'=
'* Function: DisplayUsage
'* Purpose: Displays the usage of the script and exits this script
Sub DisplayUsage( )
    WScript.Echo ""
    WScript.Echo "Usage: checkImportDeletions </m:ma-name></r:ratio-in-percentage>"
    WScript.Echo "   [/s:mms-server-name]"
    WScript.Echo "   [/u:user-name]"
    WScript.Echo "   [/a:password]"
    WScript.Echo "   [/v] Switch on Verbose mode"
    WScript.Echo "   [/?] Show the Usage of the script"
    WScript.Echo ""
    WScript.Echo "Example 1: checkImportDeletions /m:adma1 /r:20 --> Check for 20% Import Deletion Ratio"
    WScript.Echo "Example 2: checkImportDeletions /m:adma1 /r:20 -s:mymmsserver -u:domain\user -a:mysecret -v"
    WScript.Quit (1)
End Sub
'Example Script Main Execution Starts Here
'Used Variables
dim s; dim rescode; dim managementagentName; dim profile; dim
verbosemode; dim wmiLocator; dim wmiService; dim
managementagent; dim server; dim
username; dim password; dim ratio; dim result
rescode = ParamExists("/?")
if rescode = true then call DisplayUsage
verbosemode = ParamExists("/v")
managementagentName = ParamValue("/m")
if managementagentName = "" then call DisplayUsage
ratio = ParamValue("/r")
if ratio = "" then call DisplayUsage
if not isnumeric(ratio) then
    wscript.echo "%Parameter error: Ratio is not numeric."
    wscript.quit(1)
end if
if CInt(ratio) > 100 or CInt(ratio) < 1 then
    wscript.echo "%Parameter error: Ratio must be between 1 and 100."
    wscript.quit(1)
end if
if verbosemode = true then wscript.echo "%Info: Management Agent is <"& managementagentName &">"
if verbosemode = true then wscript.echo "%Info: Getting WMI Locator object."
Set wmiLocator = CreateObject("WbemScripting.SWbemLocator")
if err.number <> 0 then
    wscript.echo "%Error: Cannot get WMI Locator object"
    wscript.quit(1)
end if
server = ParamValue("/s")
password = ParamValue("/a")
username = ParamValue("/u")
if server = "" then server = "." 'connect to WMI on
local machine
if verbosemode then
    wscript.Echo "%Info: Connecting to MMS WMI Service on <" & server &">"
    if username <> "" then wscript.Echo "%Info: Accessing MMS WMI Service as <"& username &">"
end if
if username = "" then
    set wmiService = wmiLocator.ConnectServer(server, "root/MicrosoftIdentityIntegrationServer")
else
    set wmiService = wmiLocator.ConnectServer(server, "root/MicrosoftIdentityIntegrationServer", username, password)
end if
if err.number <> 0 then
    wscript.echo "%Error: Cannot connect to MMS WMI Service <" & err.Description & ">"
```

-continued

```
    wscript.quit(1)
end if
if verbosemode then WScript.Echo "%Info: Getting MMS Management
Agent via WMI"
Set managementagent = wmiService.Get( "MIIS_ManagementAgent.
Name="" & managementagentName & """)
if err.number <> 0 then
    wscript.echo "%Error: Cannot get Management Agent with specified
WMI Service <" & err.Description & ">"
    wscript.quit(1)
end if
if verbosemode then
    wscript.echo ""
    wscript.echo "%--- STATISTICS START ---"
    wscript.echo "Number of objects in CS      : "&
managementagent.NumCSObjects
    wscript.echo "Sum of Connectors           : "&
managementagent.NumTotalConnectors
    wscript.echo "Sum of Disconnectors        : "&
managementagent.NumTotalDisconnectors
    wscript.echo "Number of Normal Connectors    : "&
managementagent.NumConnectors
    wscript.echo "Number of Normal Disconnectors : "&
managementagent.NumDisconnectors
    wscript.echo "Number of Explicit Connectors : "&
managementagent.NumExplicitConnectors
    wscript.echo "Number of Explicit Disconnectors: "&
managementagent.NumExplicitDisconnectors
    wscript.echo "Number of Filtered Disconnectors: "&
managementagent.NumFilteredDisconnectors
    Wscript.echo "--------------------------------------------------"
    wscript.echo "Number of Import Add       : "&
managementagent.NumImportAdd
    wscript.echo "Number of Import Del       : "&
managementagent.NumImportDelete
    wscript.echo "Number of Import Mod       : "&
managementagent.NumImportUpdate
    wscript.echo "Number of Import with no changes: "&
managementagent.NumImportNoChange
    Wscript.echo "--------------------------------------------------"
    wscript.echo "Number of Export Add       : "&
managementagent.NumExportAdd
    wscript.echo "Number of Export Del       : "&
managementagent.NumExportDelete
    wscript.echo "Number of Export Mod       : "&
managementagent.NumExportUpdate
    wscript.echo "%--- STATISTICS End ---"
    wscript.echo ""
end if
result = managementagent.NumImportDelete / managementagent.
NumCSObjects
* 100
if result >= CInt(ratio) then
    WScript.Echo "%ATTENTION: Ratio is hit. Setting errorlevel to 2"
    Wscript.quit(2)
end if
WScript.Echo "%Success: Ratio is not hit"
Wscript.quit(0)
'* Function: ParamValue
'* Purpose: Parses the command line for an argument and
'*          returns the value of the argument to the caller
'*          Argument and value must be seperated by a colon
'* Arguments:
'* [in]    parametername   name of the paramenter
'* Returns:
'*         STRING   Parameter found in commandline
'*         ""       Parameter NOT found in commandline
Function ParamValue(ParameterName)
    Dim i              '* Counter
    Dim Arguments      '* Arguments from the command-line command
    Dim NumberofArguments '* Number of arguments from the command-
line command
    Dim ArgumentArray      '* Array in which to store the
arguments from the command-line
    Dim TemporaryString   '* Utility string
    '* Initialize Return Value to be the Empty String
    ParamValue = ""
    '* If no ParameterName is passed into the function exit
    if ParameterName = "" then exit function
```

-continued

```
    '* Check if Parameter is in the Arguments and return the value
    Set Arguments = WScript.Arguments
    NumberofArguments = Arguments.Count - 1
    For i=0 to NumberofArguments
        TemporaryString = Arguments(i)
        ArgumentArray = Split(TemporaryString,":",-1,vbTextCompare)
        If ArgumentArray(0) = ParameterName Then
            ParamValue = ArgumentArray(1)
            exit function
        End If
    Next
end Function
'* Function: ParamExists
'* Purpose: Parses the command line for an argument and
'*          returns the true if argument is present
'* Arguments:
'* [in]    parameter   name name of the paramenter
'* Returns:
'*         true Parameter found in commandline
'*         false Parameter NOT found in commandline
'*
Function ParamExists(ParameterName)
    Dim i              '* Counter
    Dim Arguments      '* Arguments from the command-line command
    Dim NumberofArguments '* Number of arguments from the
command-line command
    Dim ArgumentArray      '* Array in which to store the arguments
from the command-line
    Dim TemporaryString   '* Utility string
    '* Initialize Return Value to e the Empty String
    ParamExists = false
    '* If no ParameterName is passed into the function exit
    if ParameterName = "" then exit function
    '* Check if Parameter is in the Arguments and return the value
    Set Arguments = WScript.Arguments
    NumberofArguments = Arguments.Count - 1
    For i=0 to NumberofArguments
        TemporaryString = Arguments(i)
        If TemporaryString = ParameterName Then
            ParamExists = true
            exit function
        End If
    Next
end Function
```

Figure 9:
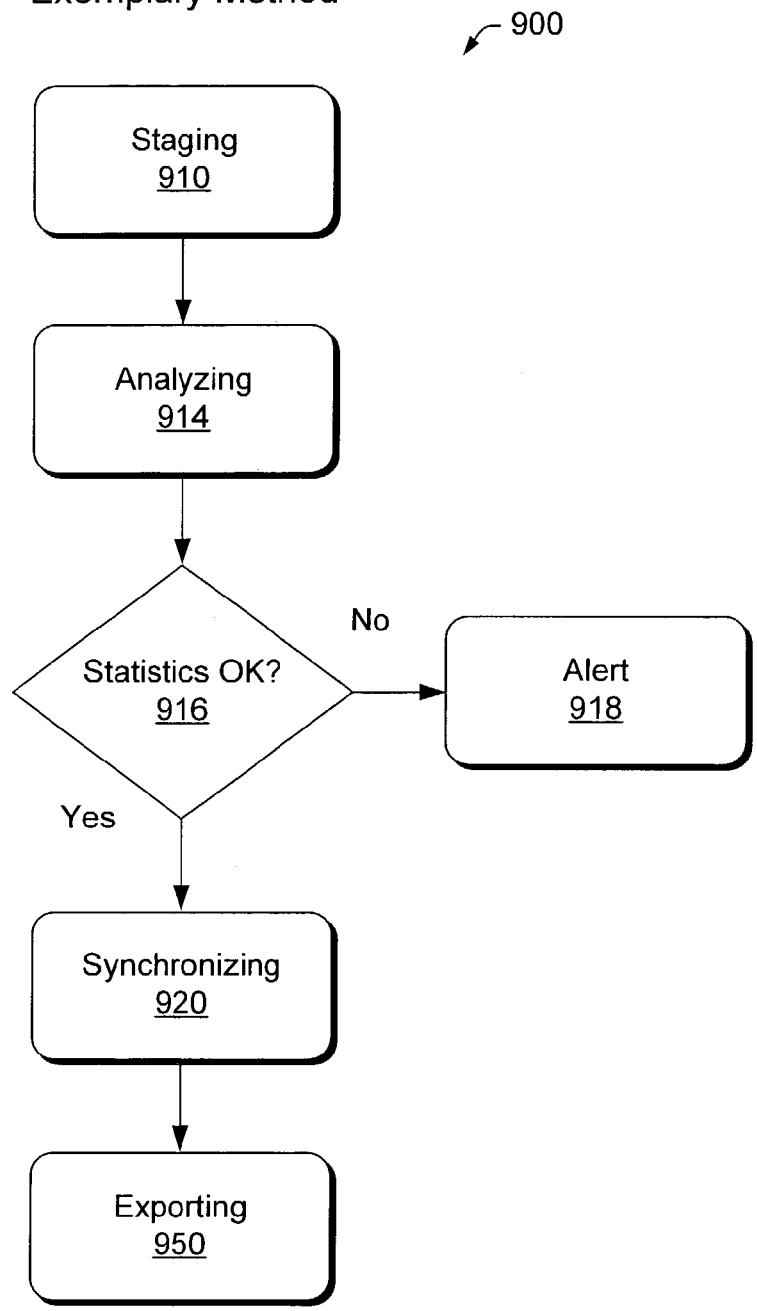
FIG. 9 is a block diagram of an exemplary method of processing and analyzing information in an exemplary metadirectory.

FIG. 9 shows an exemplary method 900 for analyzing directory information. Staging 910 stages directory information from one or more data sources to a buffer of a storage layer of an exemplary metadirectory (e.g., as a staged object). Analyzing 914 analyzes the staged directory information, for example, to produce statistics. A decision block 916 follows wherein a decision is made based at least in part on a result of the analyzing 914. A negative decision may indicate that fatal errors exist, that directory information may be compromised, that metadirectory stability is at risk, etc. Under such circumstances, an alert may be issued per the alert block 918. Such an analysis, decision and/or alert may be performed automatically and/or with user input (e.g., interactively). A positive decision from the decision block 916 may indicate that further processing of directory information may occur. Hence, synchronizing 920 may occur wherein aggregating or managing of directory information may take place. Exporting 950 optionally follows to thereby complete a directory information update cycle (e.g., per the exemplary method 700 of FIG. 7).

As already mentioned, information may be available with respect to state. Under such circumstances, analyses may occur after each state, optionally followed by decision and/or alert blocks, as appropriate. For example, analyzing may occur after synchronizing 920 and/or after exporting 950. Of course, analyzing may occur after sub-operations as well (e.g., joining, projecting, flowing, provisioning, deprovisioning, flowing, etc.). Such analyses may allow an administrator or other user to manage the exemplary metadirectory more effectively.

Figure 10:
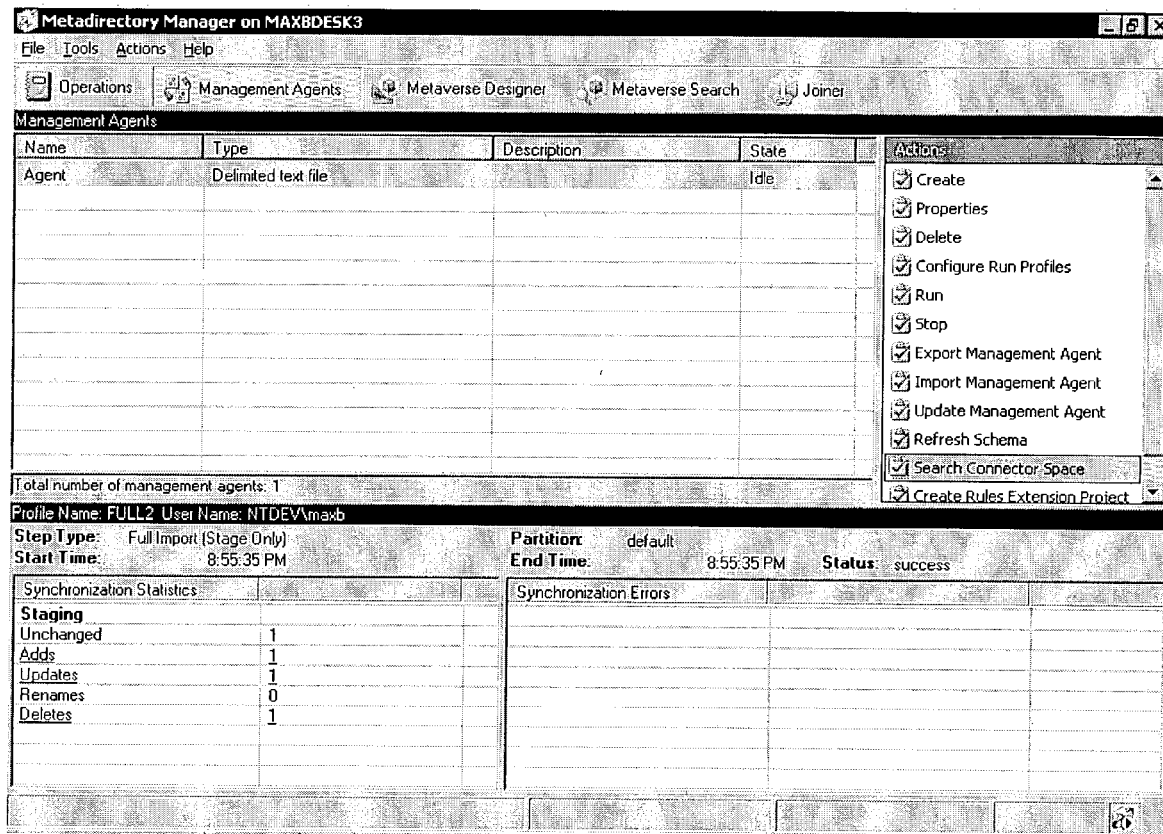
FIG. 10 is an exemplary screen shot generated by an exemplary metadirectory showing statistics.

FIG. 10 shows an exemplary screen shot 1000 generated by an exemplary metadirectory that includes various exemplary features as discussed above. The screen shot 1000 further exhibits an exemplary user interface. According to this particular example, an agent may be a service module of a services layer, a connector space may be a buffer of a storage layer and a metaverse may be a core of a storage layer. A management agent typically has an associated directory and an associated data source. For example, execution of such a management agent in a "full import" mode may cause directory information within a certain scope to be staged in a connector space (e.g., buffer) of a metadirectory. Note that such a mode may be limited to a certain state of operation. For example, the full import mode may be limited to staging only. An analysis may occur after staging to thereby show "synchronization statistics" for staging. Such statistics are shown in the exemplary screen shot 1000 in a table at the lower left. The statistics indicate that, for the particular directory, one entry is unchanged, one entry is added, one entry is updated, no entries are renamed, and one entry is deleted. In this example, entries may be objects, attributes of objects, etc. In general, such entries are part of a hierarchical directory used by one or more data sources. Further, the exemplary screen shot 1000 indicates that no errors occurred during execution of the staging module.

Figure 11:
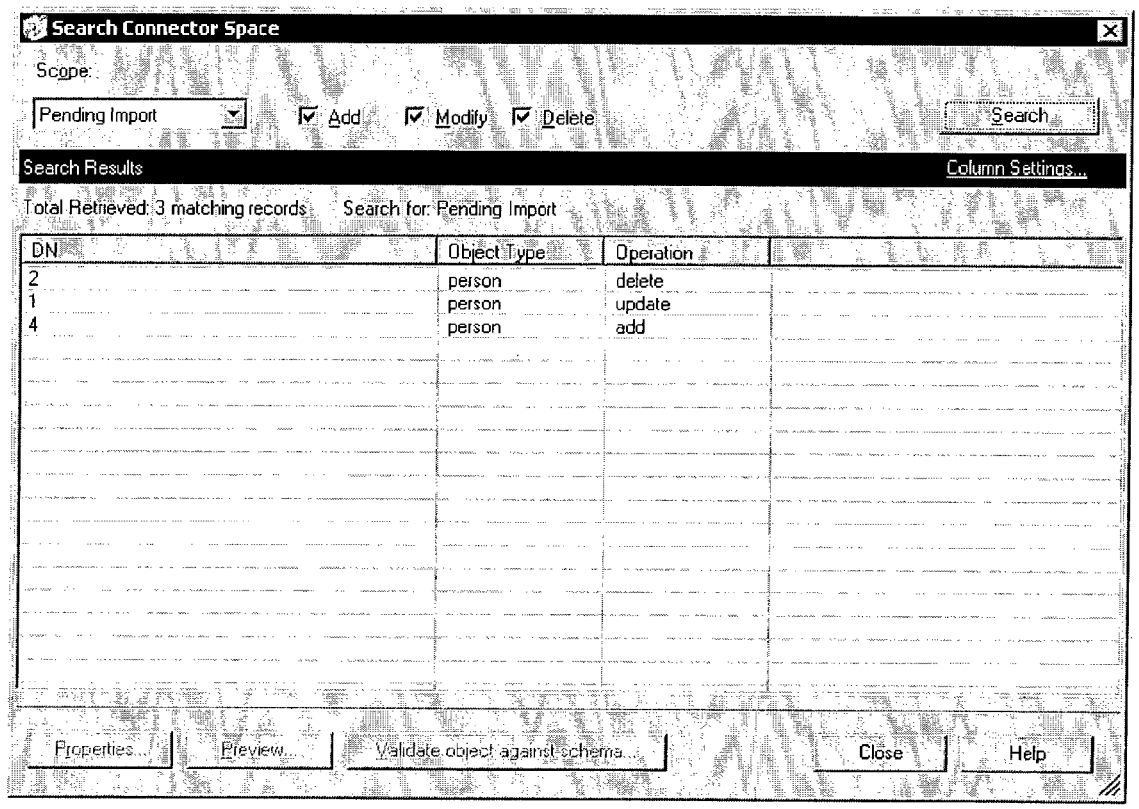
FIG. 11 is an exemplary screen shot generated by an exemplary metadirectory showing search results.

FIG. 11 shows an exemplary screen shot 1100 generated by an exemplary metadirectory that includes various exemplary features as discussed above. The screen shot 1100 further exhibits an exemplary user interface. This particular screen shot 1100 includes a user selectable pull-down menu for determining scope of a connector space (e.g., a buffer area) search. In this example, the menu indicates that the search will be limited to a scope of buffer entities pending import (e.g., import to a core of the metadirectory). Further, a plurality of checkboxes allows a user to select operations for limiting the search. In this example, checkboxes for "add", "modify" and "delete" operations (or delta types) are selected. The screen shot 1100 shows search results presented in tabular form for three matching records (e.g., after selecting the "Search" button). While the exemplary screen shot 1100 shows three columns in the search results, other options are available, for example, see the underlined text "Column Settings". The results indicate distinguished name (DN) of each "record", object type of each record and operation associated with each record. Again, in this situation, the term "record" may refer to an entity (e.g., an object, etc.) that has one or more attributes as dictated by a directory schema. More specifically, DN: 2 has a person object type and an associated delete operation; DN: 1 has a person object type and an associated update operation (e.g., optionally including under "modify"); and DN: 4 has a person object type and an associated add operation. Hence, in this example, the operations refer to an entity and not specifically to any particular attribute of the entity, noting that the referenced operation should pertain to at least one of the attributes.

Figure 12:
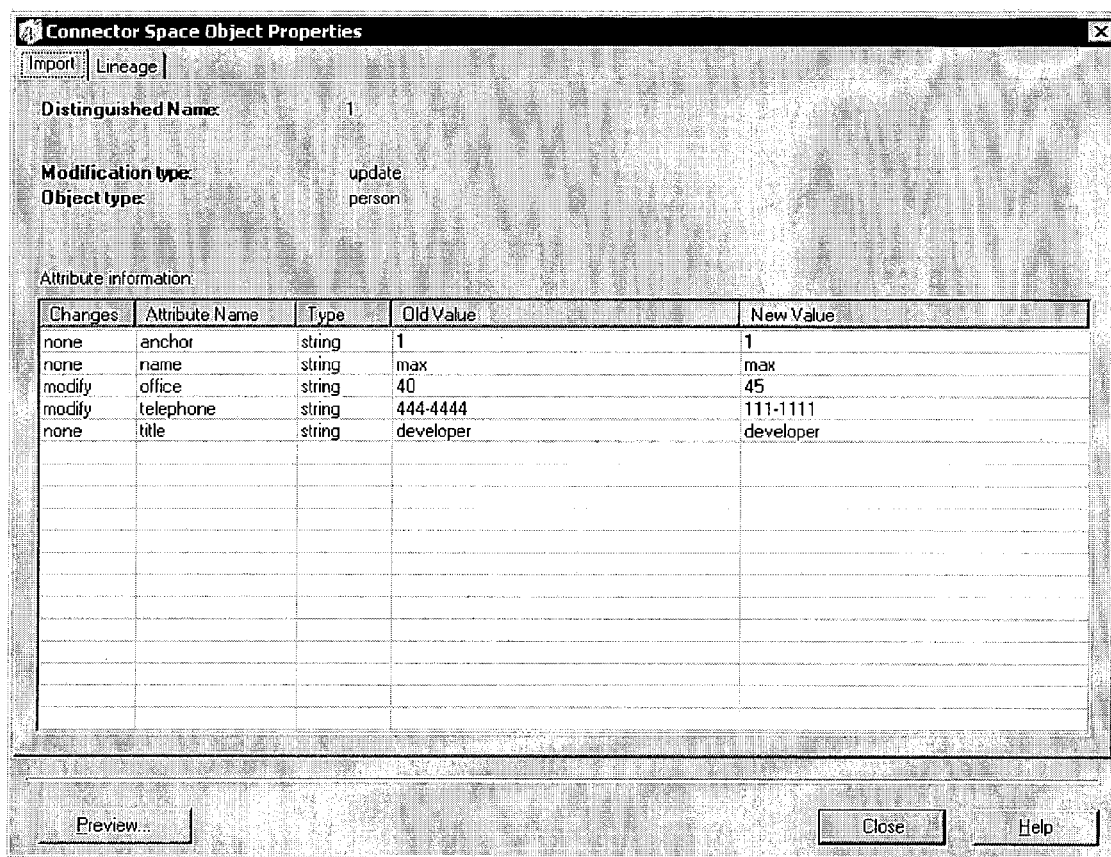
FIG. 12 is an exemplary screen shot generated by an exemplary metadirectory showing properties associated with an object (e.g., an entity, etc.).

FIG. 12 shows an exemplary screen shot 1200 generated by an exemplary metadirectory that includes various exemplary features as discussed above. The screen shot 1200 further exhibits an exemplary user interface. This particular screen shot 1200 was generated in response to a user selection of the DN: 1 entry on the results table of the exemplary user interface exhibited by the exemplary screen shot 1100 of FIG. 11 (e.g., a double click or other user operation). Hence, the exemplary screen shot 1200 shows specific information associated with DN: 1.

In particular, the attribute information for five attributes of DN: 1 includes, but is not limited to, relevant delta information for the DN: 1 object. In this instance, the delta information may be considered applied information to thereby generate the attribute values of the "New Value" column. Sometimes the new value is referred to as a "post-image" of an entry whereas an "Old Value" may be referred to as a "pre-image" of an entry. Such values or "images" may be stored according to XML in association with an object.

Referring again to the table for DN: 1, only two of the five attributes have associated change information that indicates an add, a delete or a modify operation (e.g., Attribute Name "office" and Attribute Name "telephone"). Again, during staging, for example, such delta information may be associated with an object in a buffer of a storage layer of an exemplary metadirectory. Such an association allows for searching entities in a buffer based at least in part on operations (e.g., delta operations). Of course, as discussed above, searches may be on a level below the object or entity level (e.g., at the attribute level).

Figure 13:
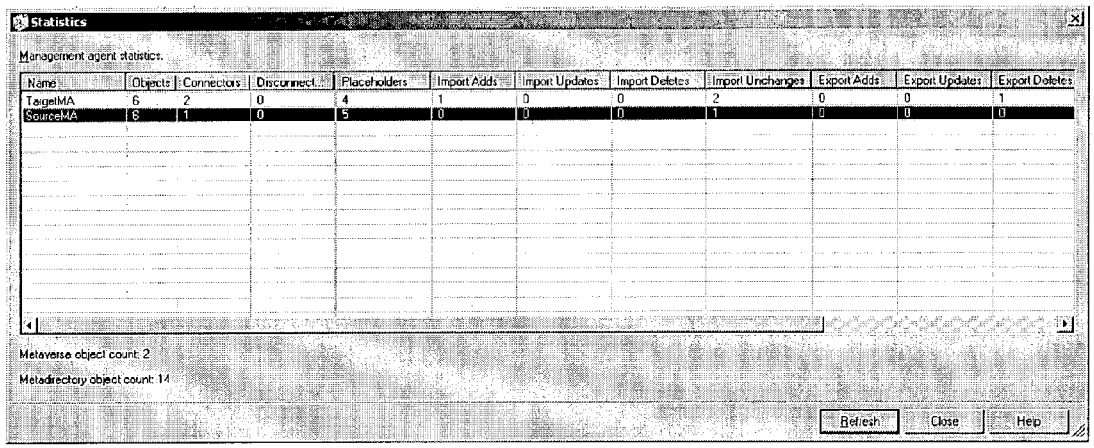
FIG. 13 is an exemplary screen shot generated by an exemplary metadirectory showing properties associated with an object (e.g., an entity, etc.).

FIG. 13 shows an exemplary screen shot 1300 generated by an exemplary metadirectory that includes various exemplary features as discussed above. The screen shot 1300 further exhibits an exemplary user interface. In this example, the user interface screen shot, labeled "statistics", shows a view of relatively simple statistics obtained by counting the number of objects of each type. Note that a traditional metadirectory may not include a rich set of types and hence, in such an instance, a type ordered count presentation may be meaningless. In this scenario, a management agent (e.g., a service module that participates in various processes) named "TargetMA" has one object with pending import "add" and two objects with pending import "no change". There is also an object associated with the TargetMA having a pending export "delete", which could be either in unapplied or escrowed. Another row shows counts for a management agent named "SourceMA". The exemplary screen shot 1300 also lists a "Metaverse object count" and a "Metadirectory object count".

Figure 14:
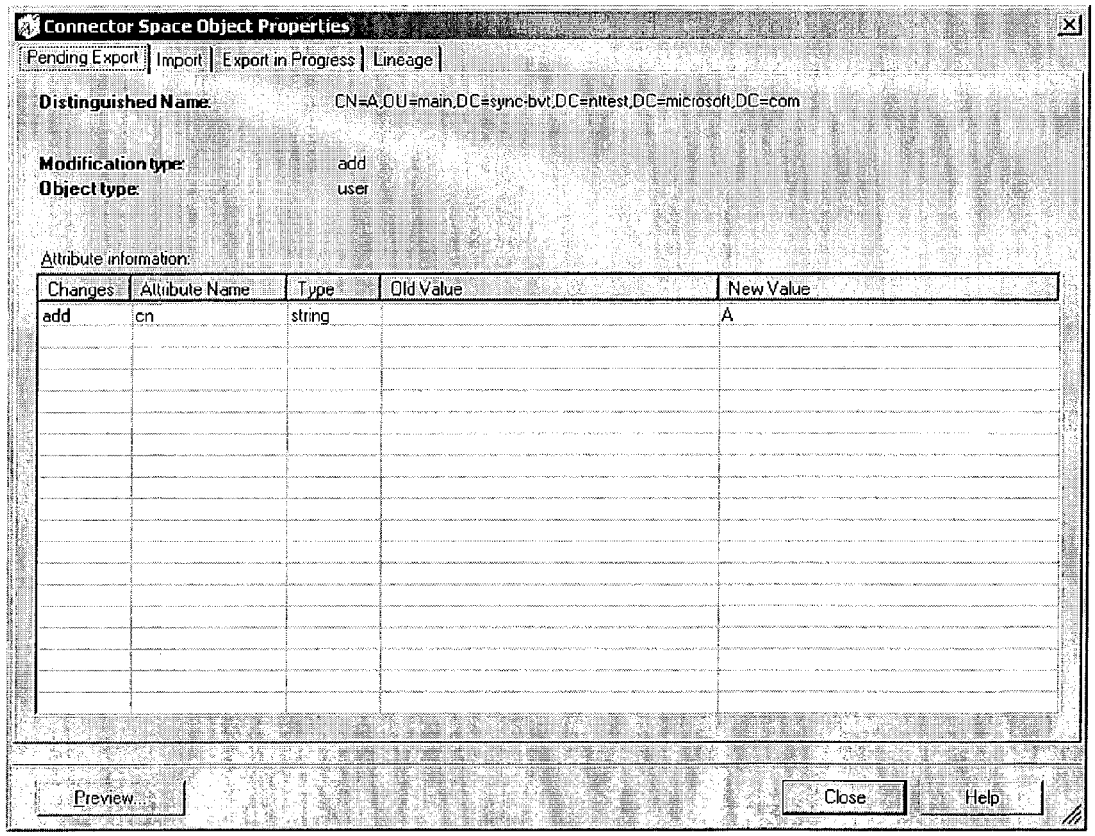
FIG. 14 is an exemplary screen shot generated by an exemplary metadirectory showing properties associated with an object (e.g., an entity, etc.).

FIG. 14 shows an exemplary screen shot 1400 generated by an exemplary metadirectory that includes various exemplary features as discussed above. The screen shot 1400 further exhibits an exemplary user interface. In this example, various details for an object having a particular synchronization tower are shown. In the screen shot 1400, a pending export delta (e.g., an unapplied export delta, UnaE_Δ) is shown, wherein other tabs represent the import delta (e.g., a pending import delta, PI_Δ), the export in progress delta (e.g., an escrowed export delta, EE_Δ), and lineage (see, e.g., screen shot 1500 of FIG. 15). Of course, appropriate tabs may be user selected or generated automatically depending on processes, needs and/or desires.

Figure 15:
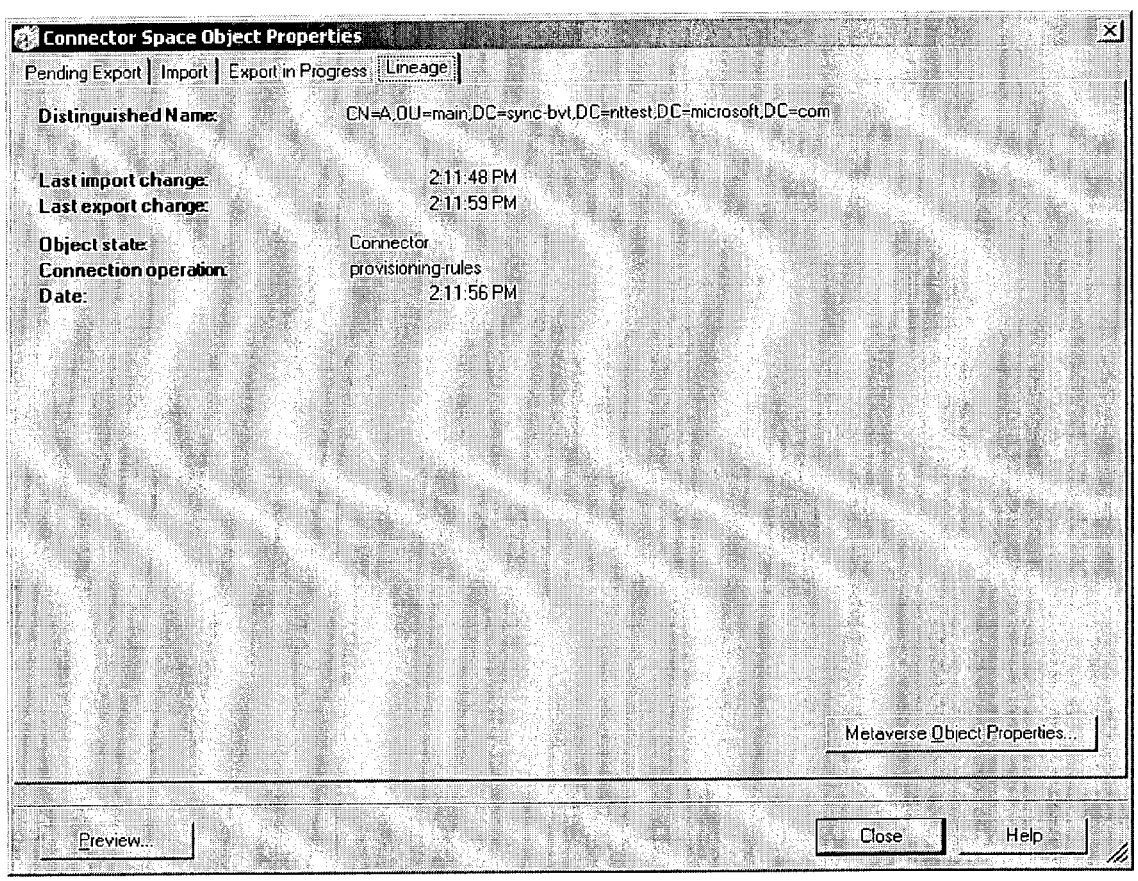
FIG. 15 is an exemplary screen shot generated by an exemplary metadirectory showing properties associated with an object (e.g., an entity, etc.).

FIG. 15 shows an exemplary screen shot 1500 generated by an exemplary metadirectory that includes various exemplary features as discussed above. The screen shot 1500 further exhibits an exemplary user interface. In this example, the exemplary screen shot 1500 and user interface relates to the last tab of a "Connector Space Objects Properties" page. This particular screen shot 1500 shows a few more items that are "staged" on a particular entity or object that are helpful for troubleshooting. For example, the screen shot 1500 includes "Last import change", which may include a date/time for a last import change on the particular object; "Last export change", which may include a last time an exported change occurred for the particular object; "Object state", which may include whether this is a connector object; "Connection operation", which may include how this particular object became joined to a core area; and "Date", which may include a date at which this particular object became joined to a core area.

The exemplary screen shot 1500 also includes a button entitled "Metaverse Object Properties", which upon selection may display details concerning metaverse (e.g., core area) properties for a particular entity or entities.

Again, while various examples have been described with respect to one or more directories and/or a metadirectory, various exemplary devices, systems and/or methods may apply to an information environment wherein information is not organized in one or more directories and/or a metadirectory.

Figure 16:
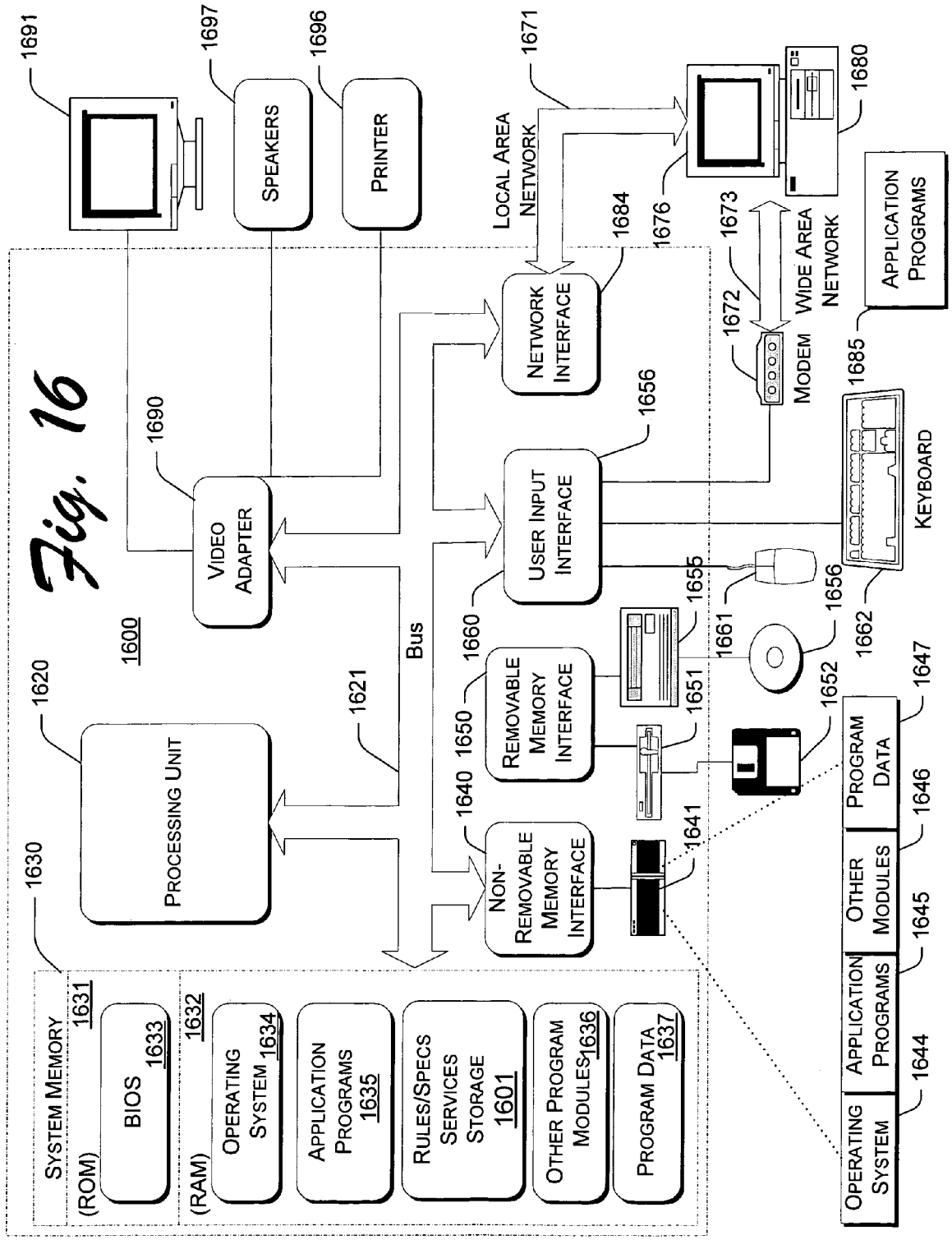
FIG. 16 is a block diagram of an exemplary computing device suitable for use with various subject matter disclosed herein.

FIG. 16 shows an exemplary computer 1600 suitable as an environment for practicing various aspects of subject matter disclosed herein. Components of computer 1600 may include, but are not limited to, a processing unit 1620, a system memory 1630, and a system bus 1621 that couples various system components including the system memory 1630 to the processing unit 1620. The system bus 1621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computer 1600 typically includes a variety of computer-readable media. Computer-readable media can be any available media that can be accessed by computer 1600 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1600. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 1630 includes computer storage media in the form of volatile and/or nonvolatile memory such as read only memory (ROM) 1631 and random access memory (RAM) 1632. A basic input/output system 1633 (BIOS), containing the basic routines that help to transfer information between elements within computer 1600, such as during start-up, is typically stored in ROM 1631. RAM 1632 typically contains data and/or program modules that are immediately accessible to and/or presently being operated on by processing unit 1620. By way of example, and not limitation, FIG. 16 illustrates operating system 1634, the exemplary rules/specifications, services, storage 1601 (e.g., storage may occur in RAM or other memory), application programs 1635, other program modules 1636, and program data 1637. Although the exemplary rules/specifications, services and/or storage 1601 are depicted as software in random access memory 1632, other implementations may include hardware or combinations of software and hardware.

The exemplary computer 1600 may also include other removable/non-removable, volatile/nonvolatile computer storage media. By way of example only, FIG. 16 illustrates a hard disk drive 1641 that reads from or writes to non-removable, nonvolatile magnetic media, a magnetic disk drive 1651 that reads from or writes to a removable, nonvolatile magnetic disk 1652, and an optical disk drive 1655 that reads from or writes to a removable, nonvolatile optical disk 1656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1641 is typically connected to the system bus 1621 through a non-removable memory interface such as interface 1640, and magnetic disk drive 1651 and optical disk drive 1655 are typically connected to the system bus 1621 by a removable memory interface such as interface 1650.

The drives and their associated computer storage media discussed above and illustrated in FIG. 16 provide storage of computer-readable instructions, data structures, program modules, and other data for computer 1600. In FIG. 16, for example, hard disk drive 1641 is illustrated as storing operating system 1644, application programs 1645, other program modules 1646, and program data 1647. Note that these components can either be the same as or different from operating system 1634, application programs 1635, other program modules 1636, and program data 1637. Operating system 1644, application programs 1645, other program modules 1646, and program data 1647 are given different numbers here to illustrate that, at a minimum, they are different copies. A user may enter commands and information into the exemplary computer 1600 through input devices such as a keyboard 1662 and pointing device 1661, commonly referred to as a mouse, trackball, or touch pad. Other input devices (not shown) may include a microphone, joystick, game pad, satellite dish, scanner, or the like. These and other input devices are often connected to the processing unit 1620 through a user input interface 1660 that is coupled to the system bus, but may be connected by other interface and bus structures; such as a parallel port, game port, or a universal serial bus (USB). A monitor 1691 or other type of display device is also connected to the system bus 1621 via an interface, such as a video interface 1690. In addition to the monitor 1691, computers may also include other peripheral output devices such as speakers 1697 and printer 1696.

The exemplary computer 1600 may operate in a networked environment using logical connections to one or more remote computers, such as a remote computer 1680. The remote computer 1680 may be a personal computer, a server, a router, a network PC, a peer device or other common network node, and typically includes many or all of the elements described above relative to computer 1600. The logical connections depicted in FIG. 16 include a local area network (LAN) 1671 and a wide area network (WAN) 1673, but may also include other networks. Such networking environments are commonplace in offices, enterprise-wide computer networks, intranets, and the Internet.

When used in a LAN networking environment, the exemplary computer 1600 is connected to the LAN 1671 through a network interface or adapter 1670. When used in a WAN networking environment, the exemplary computer 1600 typically includes a modem 1672 or other means for establishing communications over the WAN 1673, such as the Internet. The modem 1672, which may be internal or external, may be connected to the system bus 1621 via the user input interface 1660, or other appropriate mechanism. In a networked environment, program modules depicted relative to the exemplary computer 1600, or portions thereof, may be stored in a remote memory storage device. By way of example, and not limitation, FIG. 16 illustrates remote application programs 1685 as residing on the remote computer 1680. It will be appreciated that the network connections shown are exemplary and other means of establishing a communications link between the computers may be used.

The subject matter described above can be implemented in hardware, in software, or in both hardware and software. In certain implementations, the exemplary flexible rules, identity information management processes, engines, and related methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The invention claimed is:

1. A method for associating and using information in a metadirectory comprising:
   receiving, for an object defined in one or more directories of at least one data source, an object name and an operation command that modifies a value of at least one attribute of the object;
   providing the metadirectory, wherein the metadirectory comprises a metadirectory schema for defining the object with an object name in association with delta information, error information, and state information for the object, wherein the delta information comprises operation commands that modified at least one attribute of the object including operation commands add, delete and modify, wherein the error information comprises at least one of an extension error or a rule error generated during a metadirectory process that pertains to the object, and wherein the state information comprises state information associated with a metadirectory process that pertains to the object, wherein metadirectory information is processed by:
      staging information, wherein the staging comprises communicating directory information from one or more data sources to the metadirectory;
      synchronizing information, wherein the synchronizing comprises aggregating information and managing information with respect to a core area and a buffer in the metadirectory, and wherein the aggregating information comprises sub-processes joining, projecting and flowing, wherein:
         joining establishes a link between an object in the core area and an object in a buffer area;
         projecting creates a storage layer entity in the core area and establishes a link between the created storage layer entity and an already existing storage layer entity; and
         flowing changes directory information in the core area of the metadirectory using a link established between an entity in the buffer and an entity in the core; and
      wherein the managing information comprises sub-processes provisioning, deprovisioning and flowing, wherein:
         provisioning is triggered by changes applied to an entity in the core area, where upon a buffer entity is created and a link between the changed entity in the core area and the created buffer entity is established; and
         deprovisioning removes buffer entities in response to metadata indicating a buffer as deleted; and
      exporting data, wherein the exporting comprises examining information in a buffer area of the metadirectory flagged for pending export and to communicate update information to at least one data sources; and
   defining, for the object defined in the one or more directories of the at least one data source, a corresponding object in the metadirectory according to the metadirectory schema wherein the corresponding object definition for the object associates the object name and the operation command that pertains to at least one attribute of the object.

2. The method of claim 1, wherein the state information comprises a pending import state, an unconfirmed export state, an escrowed export, and an unapplied export state.

3. The method of claim 2, wherein the state information includes text in an extensible markup language.

4. A method for associating and using information in a metadirectory comprising:
   receiving, for an object defined in one or more directories of at least one data source, an attribute name, an operation command and, depending on the operation command, an attribute value;
   providing the metadirectory, wherein the metadirectory comprises a metadirectory schema for defining the object with an object name in association with delta information, error information, and state information for the object, wherein the delta information comprises at least one operation command that pertains to at least one attribute of or for the object, wherein the error information, comprises at least one of an extension error or a rule error generated during a metadirectory process that pertains to the object, and wherein the state information comprises state information associated with a metadirectory process that pertains to the object; and
   defining, for the object defined in the one or more directories of the at least one data source, a corresponding object in the metadirectory according to the metadirectory schema wherein the corresponding object definition for the received object associates the attribute name, the operation command, and depending on the operation command, the attribute value;
   wherein metadirectory information is processed by:

staging information, wherein the staging comprises communicating directory information from one or more data sources to the metadirectory;

synchronizing information, wherein the synchronizing comprises aggregating information and managing information with respect to a core area and a buffer in the metadirectory, and wherein the aggregating information comprises sub-processes joining, projecting and flowing and managing information comprises sub-processes provisioning, deprovisioning and flowing; and exporting data, wherein the exporting comprises examining information in a buffer area of a metadirectory flagged for pending export and communicating update information to the at least one data source.

5. The method of claim 4, wherein the defining includes defining an object that includes delta information.

6. The method of claim 5, wherein the delta information includes an operation command.

7. The method of claim 6, wherein the operation command comprises an operation command selected from the group consisting of attribute level operation commands.

8. The method of claim 5, wherein the delta information includes state information.

9. The method of claim 8, wherein the state information comprises a pending import state, an unconfirmed export state, an escrowed export, and an unapplied export state.

10. The method of claim 9, wherein the state information includes text in an extensible markup language.

11. One or more computer readable storage media containing instructions that are executable by a computer to perform actions comprising:

receiving, for an object defined in one or more directories of at least one data source, an attribute name, an operation command and, depending on the operation command, an attribute value;

providing a metadirectory that comprises a metadirectory schema for defining the object with an object name in association with delta information, error information, and state information for the object, wherein the delta information comprises at least one operation command that pertains to at least one attribute of or for the object, wherein the error information, comprises at least one of an extension error or a rule error generated during a metadirectory process that pertains to the object, and wherein the state information comprises state information associated with a metadirectory process that pertains to the object;

defining, for the object defined in the one or more directories of the at least one data source, a corresponding object in a the metadirectory according to the metadirectory schema wherein the corresponding object definition for the received object associates error information, the attribute name, the operation command and, depending on the operation command, the attribute value;

processing the metadirectory information by:

staging information, wherein the staging comprises communicating directory information from one or more data sources to the metadirectory;

synchronizing information, wherein the synchronizing comprises aggregating information and managing information with respect to a core area and a buffer in the metadirectory, and wherein the aggregating information comprises sub-processes joining, projecting and flowing and managing information comprises sub-processes provisioning deprovisioning and flowing; and exporting data, wherein the exporting comprises examining information in a buffer area of a metadirectory flagged for pending export and communicating update information to the at least one data source generating error information related to the object; and storing, according to the object definition, at least the error information and the attribute name in a storage of the metadirectory.

12. The method of claim 11, wherein the state information comprises a pending import state, an unconfirmed export state, an escrowed export, and an unapplied export state.

13. The method of claim 11, wherein the defining includes defining an object that includes delta information.

14. The method of claim 13, wherein the delta information includes state information.

15. The method of claim 13, wherein the delta information includes an operation command.

16. The method of claim 15, wherein the operation command comprises an operation command selected from the group consisting of attribute level operation commands.

* * * * *